United States Patent
Burger et al.

(10) Patent No.: US 9,792,154 B2
(45) Date of Patent: Oct. 17, 2017

(54) DATA PROCESSING SYSTEM HAVING A HARDWARE ACCELERATION PLANE AND A SOFTWARE PLANE

(71) Applicant: Microsoft Technology Licensing, LLC, Redmond, WA (US)

(72) Inventors: Douglas C. Burger, Bellevue, WA (US); Andrew R. Putnam, Seattle, WA (US); Stephen F. Heil, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 14/717,680

(22) Filed: May 20, 2015

(65) Prior Publication Data

US 2016/0306667 A1     Oct. 20, 2016

Related U.S. Application Data

(60) Provisional application No. 62/149,488, filed on Apr. 17, 2015.

(51) Int. Cl.
| | |
|---|---|
| *G06F 9/46* | (2006.01) |
| *G06F 3/00* | (2006.01) |
| *G06F 12/00* | (2006.01) |
| *G06F 15/16* | (2006.01) |

(Continued)

(52) U.S. Cl.
CPC .......... *G06F 9/5011* (2013.01); *G06F 9/5072* (2013.01); *H04L 67/10* (2013.01)

(58) Field of Classification Search
None
See application file for complete search history.

(56) References Cited

U.S. PATENT DOCUMENTS

| 5,600,845 A | 2/1997 | Gilson |
| 5,684,980 A | 11/1997 | Casselman |
| 5,748,979 A | 5/1998 | Trimberger |

(Continued)

FOREIGN PATENT DOCUMENTS

| CN | 101276298 A | 10/2008 |
| CN | 101783812 A | 7/2010 |

(Continued)

OTHER PUBLICATIONS

International Search Report and Written Opinion mailed Jun. 23, 2016 from PCT Patent Application No. PCT/US2016/026285, 16 pages.

(Continued)

*Primary Examiner* — Bing Zhao
(74) *Attorney, Agent, or Firm* — Rainier Patents, P.S.

(57) ABSTRACT

A data processing system is described herein that includes two or more software-driven host components. The two or more host components collectively provide a software plane. The data processing system also includes two or more hardware acceleration components (such as FPGA devices) that collectively provide a hardware acceleration plane. A common physical network allows the host components to communicate with each other, and which also allows the hardware acceleration components to communicate with each other. Further, the hardware acceleration components in the hardware acceleration plane include functionality that enables them to communicate with each other in a transparent manner without assistance from the software plane.

20 Claims, 22 Drawing Sheets

(51) Int. Cl.
    *G06F 9/50* (2006.01)
    *H04L 29/08* (2006.01)

(56) References Cited

U.S. PATENT DOCUMENTS

| | | |
|---|---|---|
| 5,774,668 A | 6/1998 | Choquier et al. |
| 5,828,858 A | 10/1998 | Athanas et al. |
| 6,096,091 A | 8/2000 | Hartmann |
| 6,104,211 A | 8/2000 | Alfke |
| 6,326,806 B1 | 12/2001 | Fallside et al. |
| 6,462,579 B1 | 10/2002 | Camilleri et al. |
| 6,496,971 B1 | 12/2002 | Lesea et al. |
| 6,526,557 B1 | 2/2003 | Young et al. |
| 6,530,049 B1 | 3/2003 | Abramovici et al. |
| 6,573,748 B1 | 6/2003 | Trimberger |
| 6,915,338 B1 | 7/2005 | Hunt et al. |
| 6,996,443 B2 | 2/2006 | Marshall et al. |
| 7,111,224 B1 | 9/2006 | Trimberger |
| 7,146,598 B2 | 12/2006 | Horanzy |
| 7,224,184 B1 | 5/2007 | Levi et al. |
| 7,240,127 B2 | 7/2007 | Dubreuil |
| 7,263,631 B2 | 8/2007 | VanBuren |
| 7,340,596 B1 | 3/2008 | Crosland et al. |
| 7,382,154 B2 | 6/2008 | Ramos et al. |
| 7,389,460 B1 | 6/2008 | Demara |
| 7,444,551 B1 | 10/2008 | Johnson et al. |
| 7,500,083 B2 | 3/2009 | Trivedi et al. |
| 7,546,572 B1 | 6/2009 | Ballagh et al. |
| 7,620,883 B1 | 11/2009 | Carmichael et al. |
| 7,734,895 B1 | 6/2010 | Agarwal et al. |
| 7,899,864 B2 | 3/2011 | Margulis |
| 7,906,984 B1 | 3/2011 | Montminy et al. |
| 7,925,863 B2 | 4/2011 | Hundley |
| 7,953,014 B2 | 5/2011 | Toda et al. |
| 8,018,249 B2 | 9/2011 | Koch et al. |
| 8,018,866 B1 | 9/2011 | Kasturi et al. |
| 8,046,727 B2 | 10/2011 | Solomon |
| 8,117,497 B1 | 2/2012 | Lesea |
| 8,117,512 B2 | 2/2012 | Sorensen et al. |
| 8,145,894 B1 | 3/2012 | Casselman |
| 8,159,259 B1 | 4/2012 | Lewis et al. |
| 8,166,289 B2 | 4/2012 | Owens et al. |
| 8,171,099 B1 | 5/2012 | Malmskog et al. |
| 8,250,578 B2 | 8/2012 | Krishnamurthy et al. |
| 8,368,423 B2 | 2/2013 | Yancey et al. |
| 8,434,087 B2 | 4/2013 | Degenaro et al. |
| 8,453,013 B1 | 5/2013 | Chen |
| 8,516,268 B2 | 8/2013 | Woodall |
| 8,554,953 B1 | 10/2013 | Sorensen et al. |
| 8,635,675 B2 | 1/2014 | Kruglick |
| 8,803,876 B2 | 8/2014 | Bohan et al. |
| 8,803,892 B2 | 8/2014 | Urbach |
| 8,863,072 B1 | 10/2014 | Jahnke |
| 8,867,545 B2 | 10/2014 | Viens et al. |
| 8,901,960 B2 | 12/2014 | Takano et al. |
| 8,910,109 B1 | 12/2014 | Orthner |
| 8,924,907 B1 | 12/2014 | Jahnke et al. |
| 8,997,033 B1 | 3/2015 | Hew |
| 9,313,364 B2 | 4/2016 | Tanaka |
| 9,483,291 B1 | 11/2016 | Chen et al. |
| 2002/0161902 A1 | 10/2002 | McMahan et al. |
| 2002/0188832 A1 | 12/2002 | Mirsky et al. |
| 2003/0033450 A1 | 2/2003 | Appleby-Alis |
| 2004/0141386 A1 | 7/2004 | Karlsson |
| 2006/0015866 A1 | 1/2006 | Ang et al. |
| 2006/0143350 A1 | 6/2006 | Miloushev et al. |
| 2008/0120500 A1 | 5/2008 | Kimmery et al. |
| 2008/0164907 A1 | 7/2008 | Mercaldi-Kim et al. |
| 2008/0184042 A1 | 7/2008 | Parks et al. |
| 2008/0270411 A1 | 10/2008 | Sedukhin et al. |
| 2008/0276262 A1 | 11/2008 | Munshi et al. |
| 2008/0279167 A1 | 11/2008 | Cardei et al. |
| 2008/0307259 A1 | 12/2008 | Vasudevan et al. |
| 2009/0063665 A1 | 3/2009 | Bagepalli et al. |
| 2009/0147945 A1 | 6/2009 | Doi et al. |
| 2009/0182814 A1 | 7/2009 | Tapolcai et al. |
| 2009/0187733 A1 | 7/2009 | El-Ghazawi |
| 2009/0189890 A1 | 7/2009 | Corbett et al. |
| 2009/0210487 A1 | 8/2009 | Westerhoff et al. |
| 2009/0278564 A1 | 11/2009 | DeHon et al. |
| 2010/0083010 A1 | 4/2010 | Kern et al. |
| 2010/0106813 A1 | 4/2010 | Voutilainen et al. |
| 2010/0121748 A1 | 5/2010 | Handelman et al. |
| 2010/0251265 A1 | 9/2010 | Hodson et al. |
| 2011/0078284 A1 | 3/2011 | Bomel et al. |
| 2011/0153824 A1 | 6/2011 | Chikando et al. |
| 2011/0161495 A1 | 6/2011 | Ratering et al. |
| 2012/0047239 A1 | 2/2012 | Donahue et al. |
| 2012/0110192 A1 | 5/2012 | Lu et al. |
| 2012/0110274 A1 | 5/2012 | Rosales et al. |
| 2012/0150952 A1 | 6/2012 | Beverly |
| 2012/0260078 A1 | 10/2012 | Varnum et al. |
| 2012/0324068 A1 | 12/2012 | Jayamohan et al. |
| 2013/0055240 A1 | 2/2013 | Gondi |
| 2013/0152099 A1 | 6/2013 | Bass et al. |
| 2013/0205295 A1 | 8/2013 | Ebcioglu et al. |
| 2013/0226764 A1 | 8/2013 | Battyani |
| 2013/0227335 A1 | 8/2013 | Dake et al. |
| 2013/0305199 A1 | 11/2013 | He et al. |
| 2013/0314559 A1 | 11/2013 | Kim |
| 2014/0007113 A1 | 1/2014 | Collin et al. |
| 2014/0055467 A1 | 2/2014 | Bittner et al. |
| 2014/0115151 A1 | 4/2014 | Kruglick |
| 2014/0118026 A1 | 5/2014 | Aldragen |
| 2014/0245061 A1 | 8/2014 | Kobayashi |
| 2014/0258360 A1 | 9/2014 | Hebert et al. |
| 2014/0267328 A1 | 9/2014 | Banack et al. |
| 2014/0280499 A1 | 9/2014 | Basavaiah et al. |
| 2014/0282506 A1 | 9/2014 | Cadigan et al. |
| 2014/0282586 A1 | 9/2014 | Shear et al. |
| 2014/0310555 A1 | 10/2014 | Schulz et al. |
| 2014/0351811 A1 | 11/2014 | Kruglick |
| 2014/0380025 A1 | 12/2014 | Kruglick |
| 2015/0026450 A1 | 1/2015 | Adiki et al. |
| 2015/0058614 A1 | 2/2015 | Degenaro et al. |
| 2015/0089204 A1 | 3/2015 | Henry et al. |
| 2015/0100655 A1 | 4/2015 | Pouzin et al. |
| 2015/0169376 A1 | 6/2015 | Chang et al. |
| 2015/0186158 A1 | 7/2015 | Yalamanchili et al. |
| 2015/0199214 A1 | 7/2015 | Lee et al. |
| 2015/0261478 A1 | 9/2015 | Obayashi |
| 2015/0271342 A1 | 9/2015 | Gupta et al. |
| 2015/0339130 A1 | 11/2015 | Kruglick |
| 2015/0371355 A1 | 12/2015 | Chen |
| 2015/0373225 A1 | 12/2015 | Tanaka |
| 2015/0379100 A1 | 12/2015 | Vermeulen |
| 2016/0202999 A1 | 7/2016 | Van Den Heuvel et al. |
| 2016/0210167 A1 | 7/2016 | Bolic et al. |
| 2016/0306668 A1 | 10/2016 | Heil et al. |
| 2016/0306674 A1 | 10/2016 | Chiou et al. |
| 2016/0306700 A1 | 10/2016 | Heil et al. |
| 2016/0306701 A1 | 10/2016 | Heil et al. |
| 2016/0308649 A1 | 10/2016 | Burger et al. |
| 2016/0308718 A1 | 10/2016 | Lanka et al. |
| 2016/0308719 A1 | 10/2016 | Putnam et al. |
| 2016/0378460 A1 | 12/2016 | Chiou et al. |
| 2016/0380819 A1 | 12/2016 | Burger |
| 2016/0380912 A1 | 12/2016 | Burger et al. |

FOREIGN PATENT DOCUMENTS

| | | |
|---|---|---|
| CN | 101545933 B | 1/2012 |
| CN | 102377778 A | 3/2012 |
| CN | 102724478 A | 10/2012 |
| CN | 103246582 A | 8/2013 |
| CN | 103677916 A | 3/2014 |
| EP | 2199910 A1 | 6/2010 |
| EP | 2650786 A2 | 10/2013 |
| JP | 2005235074 A | 5/2010 |
| JP | 2013062566 A | 4/2013 |
| WO | 2013/049079 A2 | 4/2013 |
| WO | 2013/158707 A1 | 10/2013 |
| WO | 2013177316 A2 | 11/2013 |

(56) References Cited

FOREIGN PATENT DOCUMENTS

| WO | 2014019428 A1 | 2/2014 |
|---|---|---|
| WO | 2015026373 A1 | 2/2015 |
| WO | 2015042684 A1 | 4/2015 |

OTHER PUBLICATIONS

International Search Report and Written Opinion mailed Jul. 4, 2016 from PCT Patent Application No. PCT/US2016/026287, 17 pages.
U.S. Appl. No. 62/149,488 titled "Data Processing System having a Hardware Acceleration Plane and a Software Plane," filed Apr. 17, 2015 by Inventors Douglas C. Burger, Adrian M. Caulfield and Derek T. Chiou, 156 pages.
International Search Report and Written Opinion mailed Jul. 4, 2016 from PCT Patent Application No. PCT/US2016/026286, 15 pages.
Oden et al., "GGAS: Global GPU Address Spaces for Efficient Communication in Heterogeneous Clusters", 2013 IEEE International Conference on Cluster Computing (CLUSTER), IEEE, Sep. 23, 2013, pp. 1-8, 8 pages.
Southard, Dale, "Best Practices for Deploying and Managing GPU Clusters", Dec. 18, 2012 Internet Webinar retrieved from <<http://on-demand.gputechconf.com/gtc-express/2012/presentations;deploying-managing-gpu-clusters.pdf>> on Jun. 20, 2016, 17 pages.
Non-Final Office Action mailed Nov. 7, 2016 to U.S. Appl. No. 14/717,752, 51 pages.
Cervero, et al., "A resource manager for dynamically reconfigurable FPGA-based embedded systems," in Proceedings of the Euromicro Conference on Digital System Design, Sep. 2013, 8 pages.
Unnikrishnan, et al., "Reconfigurable Data Planes for Scalable Network Virtualization," in IEEE Transactions on Computers, vol. 62, No. 1, Jan. 2013, 14 pages.
Romoth, et al., "Optimizing Inter-FPGA Communication by Automatic Channel Adaptation," in Proceedings of the International Conference on Reconfigurable Computing and FPGAs, Dec. 2012, 7 pages.
"An Introduction to the NI LabVIEW RIO Architecture," available at <<http://www.ni.com/white-paper/10894/en/>>, National Instruments Corporation, Austin, TX, published on Jan. 28, 2015, 4 pages.
Eshelman, DJ, "Think You Don't Need GPUs in the Datacenter? Think Again," available at <<http://www.gtri.com/think-you-dont-need-gpus-in-the-datacenter-think-again/>>, Global Technologies Resources, Inc., published on Jul. 23, 2014, 9 pages.
Alachiotis, et al., "Efficient PC-FPGA Communication Over Gigabit Ethernet," in Proceedings of the 10th IEEE International Conference on Computer and Information Technology, Jun. 2010, 8 pages.
Khalilzad, et al., "FPGA implementation of Real-time Ethernet communication using RMII Interface," in Proceedings of the IEEE 3rd International Conference on Communication Software and Networks, May 2011, 7 pages.
Inoue, et al., "20Gbps C-Based Complex Event Processing," in Proceedings of the 2011 21st International Conference on Field Programmable Logic and Applications, 2011, 6 pages.
Tan, et al., "Datacenter-Scale Network Research on FPGAs," in Proceedings of the Exascale Evaluation and Research Techniques Workshop, 2011, 6 pages.
Sverdlik, Yevgeniy, "Intel to Offer Hyper-Scale Operators Ability to Reconfigure CPUs on a Dime," available at <<http://www.datacenterknowledge.com/archives/2014/06/19/intel-offer-hyper-scale-operators-ability-reconfigure-cpusdime/>>, Data Center Knowledge, Jun. 19, 2014, 3 pages.
"Altera Programmable Logic is Critical DNA in Software Defined Data Centers," available at <<http://newsroom.altera.com/press-releases/altera-microsoft-datacenter.htm>>, Altera Corporation, San Jose, CA, Jun. 16, 2014, 2 pages.
"Cisco UCS C240-M3 Rack Server with NVIDIA GRID GPU cards on Citrix XenServer 6.2 and XenDesktop 7.5," available at <<http://www.cisco.com/c/en/us/products/collateral/servers-unified-computing/ucs-c-series-rack-servers/whitepaper_C11-732283.pdf>>, White Paper, Cisco Systems, Inc., San Jose, CA, Jul. 2014, 38 pages.
Gazzano, et al., "Integrating Reconfigurable Hardware-Based Grid for High Performance Computing," in Scientific World Journal, vol. 2015, accessed on Apr. 8, 2015, 15 pages.
Yin, et al., "Customizing Virtual Networks with Partial FPGA Reconfiguration," in Proceedings of the Second ACM SIGCOMM Workshop on Virtualized Infrastructure Systems and Architectures, Sep. 2010, 8 pages.
Chen, et al., "Enabling FPGAs in the Cloud," in Proceedings of the 11th ACM Conference on Computing Frontiers, May 2014, 10 pages.
Fahmy, et al., "A Case for FPGA Accelerators in the Cloud," Poster in of ACM Symposium on Cloud Computing, Nov. 2014, 1 page.
Heil, et al., "Implementing a Service Using Plural Acceleration Components," U.S. Appl. No. 14/717,788, filed May 20, 2015, 112 pages.
Burger, et al., "Providing Services in a System having a Hardware Acceleration Plane and a Software Plane," U.S. Appl. No. 14/717,721, filed May 20, 2015, 118 pages.
Chiou, et al., "Handling Tenant Requests in a System that Uses Acceleration Components," U.S. Appl. No. 14/717,752, filed May 20, 2015, 120 pages.
Markettos, et al., "Interconnect for commodity FPGA clusters: standardized or customized?," in Proceedings of the 24th International Conference on Field Programmable Logic and Applications, Sep. 2014, 8 pages.
Vaz, et al., "Deferring Accelerator Offloading Decisions to Application Runtime," in Proceedings of the International Conference on ReConFigurable Computing and FPGAs, Dec. 2014, 8 pages.
Jun, et al., "Scalable Multi-Access Flash Store for Big Data Analytics," in Proceedings of 22nd ACM/SIGDA International Symposium on Field-Programmable Gate Arrays, Feb. 26, 2014, 10 pages.
Moorhead, Patrick, "Moving Beyond CPUs in the Cloud: Will FPGAs Sink or Swim?," available at <<http://www.moorinsightsstrategy.com/wp-content/uploads/2014/12/Moving-Beyond-CPUs-in-the-Cloud-Will-FPGAs-Sink-or-Swim-by-Moor-Insights-and-Strategy.pdf>>, Moor Insights and Strategies, published on Dec. 2, 2014, 5 pages.
Morris, Kevin, "FPGAs Cool Off the Datacenter," available at <<http://www.eejournal.com/archives/articles/20141118-datacenter/>>, in Electronic Engineering Journal, published on Nov. 18, 2014, 5 pages.
Wilson, Ron, "Heterogeneous Computing Meets the Data Center," available at <<http://www.altera.com/technology/system-design/articles/2014/heterogeneous-computing.html, Altera Corporation, San Jose, CA, published on Aug. 4, 2014, 3 pages.
MacVittie, Lori, "Hardware Acceleration Critical Component for Cost-Conscious Data Centers," available at <<https://devcentral.f5.com/articles/hardware-acceleration-critical-component-for-cost-conscious-data-centers>>, F5 DevCentral, published on Mar. 24, 2009, 10 pages.
Schadt, et al., "Computational Solutions to Large-Scale Data Management and Analysis," in Journal of Nature Reviews Genetics, vol. 11, Sep. 2010, 11 pages.
Pereira, Karl Savio Pimenta, "Characterization of FPGA-based High Performance Computers," Masters Thesis, Virginia Polytechnic Institute and State University, Aug. 9, 2011, 134 pages.
Chalamalasetti, et al., "Evaluating FPGA-Acceleration for Real-time Unstructured Search," in Proceedings of the IEEE International Symposium on Performance Analysis of Systems & Software, Apr. 2012, 10 pages.
Altera and IBM Unveil FPGA-Accelerated Power Systems, available at <<http://www.hpcwire.com/off-the-wire/altera-ibm-unveil-fpga-accelerated-power-systems/>>, HPC Wire, published on Nov. 17, 2014, 5 pages.
"Altera and Baidu Collaborate on FPGA-Based Acceleration for Cloud Datacenters," available at <<http://www.hpcwire.com/off-the-wire/altera-baidu-collaborate-fpga-based-acceleration-cloud-datacenters-2/>>, published on Sep. 24, 2014, HPC Wire, 5 pages.

(56) References Cited

OTHER PUBLICATIONS

Kachris, et al., "A Reconfigurable MapReduce Accelerator for Multi-Core All-Programmable SoCs," in Proceedings of the International Symposium on System-on-Chip, Oct. 28, 2014, 6 pages.
Alder, et al., "Leap Scratchpads: Automatic Memory and Cache Management for Reconfigurable Logic", in Proceedings of the 19th ACM/SIGDA International Symposium on Field Programmable Gate Arrays, Feb. 2011, 4 pages.
"Nios II Processor Reference Handbook," available at <<http://www.altera.com/literature/hb/nios2/n2cpu_nii5v1.pdf>>, Altera Corporation, San Jose, CA, Feb. 2014, 288 pages.
"Stratix V Device Handbook," available at <<http://www.altera.com/literature/hb/stratix-v/stx5_core.pdf and http://www.altera.com/literature/hb/stratix-v/stx5_xcvr.pdf>>, vols. 1 and 2, Altera Corporation, San Jose, CA, Sep. 30, 2014, 563 pages.
Baxter, et al., "Maxwell—a 64 FPGA Supercomputer," in Proceedings of the Second NASA/ESA Conference on Adaptive Hardware and Systems, Aug. 2007, 8 pages.
"BEE4 Hardware Platform", available at <<http://beecube.com/downloads/BEE42pages.pdf>>, BEEcube Inc., Fremont, CA, retrieved on Feb. 26, 2015, 2 pages.
Blott, et al., "Dataflow Architectures for 10Gbps Line-Rate Key-Value Stores," in Proceedings of the Symposium on High Performance Chips, Aug. 25, 2013, 25 pages.
Chung, et al., "CoRAM: An In-Fabric Memory Architecture for FPGA-based Computing." in Proceedings of the 19th ACM/SIGDA International Symposium on Field Programmable Gate Arrays, Feb. 2011, 10 pages.
"The Convey HC-2 Computer: Architectural Overview," available at <<http://www.conveycomputer.com/index.php/download_file/view/143/142/>>, Convey White Paper, Convey Computer Corporation, Richardson, Texas, 2012, 10 pages.
"Cray XD1 Datasheet," available at <<http://www.carc.unm.edu/~tlthomas/buildout/Cray_XD1_Datasheet.pdf>>, Cray Inc., Seattle, WA, accessed on Mar. 4, 2015, 6 pages.
Estlick, et al., "Algorithmic Transformations in the Implementation of K-Means Clustering on Reconfigurable Hardware," in Proceedings of the ACM/SIGDA Ninth International Symposium on Field Programmable Gate Arrays, Feb. 2001, 8 pages.
George, et al., "Novo-G: At the Forefront of Scalable Reconfigurable Supercomputing," in Journal of Computing in Science & Engineering, vol. 13, Issue 1, Jan. 2011, 5 pages.
Hussain, et al., "Highly Parameterized K-means Clustering on FPGAs: Comparative Results with GPPs and GPUs," in Proceedings of the International Conference on Reconfigurable Computing and FPGAs, Nov. 2011, 6 pages.
"IBM PureData System for Analytics N2001," available at <<http://public.dhe.ibm.com/common/ssi/ecm/wa/en/wad12353usen/WAD12353USEN.PDF>>, PureSystems, IBM Corporation, Armonk, NY, retrieved on Feb. 26, 2015, 8 pages.
"An Introduction to the Intel Quickpath Interconnect," available at <<http://www.intel.in/content/dam/doc/white-paper/quick-path-interconnect-introduction-paper.pdf>>, White Paper, Intel Corporation, Santa Clara, CA, Jan. 2009, 22 pages.
Kirchgessner, et al., "VirtualRC: A Virtual FPGA Platform for Applications and Tools Portability," in Proceedings of the ACM/SIGDA International Symposium on Field Programmable Gate Arrays, Feb. 2012, 4 pages.
Lavasani, et al., "An FPGA-based In-line Accelerator for Memcached," in IEEE Computer Architecture Letters, vol. 13, No. 2, Jul. 15, 2013, 4 pages.
Ling, et al., "High-performance, Energy-efficient Platforms using In-socket FPGA Accelerators," in Proceedings of the ACM/SIGDA International Symposium on Field Programmable Gate Arrays, Feb. 2009, 4 pages.
"How Microsoft Designs its Cloud-Scale Servers," available at <<http://download.microsoft.com/download/5/7/6/576F498A-2031-4F35-A156-BF8DB1ED3452/How_MS_designs_its_cloud_scale_servers_strategy_paper.pdf>>, Microsoft Corporation, Redmond, WA, retrieved on Feb. 26, 2015, 6 pages.

Pell, et al., "Surviving the end of frequency scaling with reconfigurable dataflow computing," in ACM SIGARCH Computer Architecture News, vol. 39, Issue 4, Sep. 2011, 6 pages.
Showerman, et al., "QP: A Heterogeneous Multi-Accelerator Cluster," in Proceedings of the 10th LCI International Conference on High-Performance Clustered Computing, Mar. 2009, 8 pages.
Slogsnat, et al., "An Open-Source HyperTransport Core," in Journal of ACM Transactions on Reconfigurable Technology and Systems, vol. 1, Issue 3, Sep. 2008, 21 pages.
So, et al., "A Unified Hardware/Software Runtime Environment for FPGA-Based Reconfigurable Computers using BORPH," in Journal of ACM Transactions on Embedded Computing Systems, vol. 7, Issue 2, Feb. 2008, 28 pages.
"SRC MAPstation Systems," available at <<http://www.srccomp.com/sites/default/files/pdf/SRC7_MAPstation_70000-AG.pdf>>, SRC Computers, Colorado Springs, CO, retrieved on Feb. 26, 2015, 2 pages.
Vanderbauwhede, et al., "FPGA-accelerated Information Retrieval: High-Efficiency Document Filtering," in Proceedings of the International Conference on Field Programmable Logic and Applications, Aug. 2009, 6 pages.
"MicroBlaze Processor Reference Guide, Embedded Development Kit," available at <<http://www.xilinx.com/support/documentation/sw_manuals/xilinx14_2/mb_ref_guide.pdf>>, Version EDK 14.2, Xilinx, Inc., San Jose, CA, 2012, 256 pages.
Yan, et al., "Efficient Query Processing for Web Search Engine with FPGAs," in Proceedings of the IEEE 20th International Symposium on Field-Programmable Custom Computing Machines, Apr. 2012, 4 pages.
Putnam, et al., "A Reconfigurable Fabric for Accelerating Large-Scale Datacenter Services," in Proceedings of the ACM/IEEE 41st International Symposium on Computer Architecture, Jun. 14, 2014, 12 pages.
Martin, et al., "FPGA-Based Application Acceleration: Case Study with GZIP Compression/Decompression Streaming Engine," in ICCAD Special Session 7C, abstract only, Nov. 2013, 1 page.
Stuecheli, Jeff, "Next Generation Power Microprocessor," in Hot Chips: A Symposium on High Performance Chips, Aug. 2013, 20 pages.
"Accelium™ 3700 Coprocessor," available at <<http://drc-computer.com/downloads/DRC%20Accelium%203700%20Datasheet%20-%20Oct%202013.pdf>>, DRC Computer Corporation, Santa Clara, CA, retrieved on Mar. 4, 2015, 1 page.
International Search Report and Written Opinion mailed Jun. 20, 2016 from PCT Patent Application No. PCT/US2016/026291, 11 pages.
"Secure Computing Architecture", retrieved at <<http://www.syprisresearch.com/home/secure-computing-architecture>> on Feb. 23, 2015, 4 pages.
Abel et al., "Increasing Design Changeability using Dynamical Partial Reconfiguration", Proceedings of the 16th IEEE NPSS Real Time Conference, May 10, 2009, 7 pages.
Bharathi et al., "A Reconfigurable Framework for Cloud Computing Architecture", Journal of Artificial Intelligence, vol. 6, Issue 1, Jan. 14, 2013, 4 pages.
Conger et al., "FPGA Design Framework for Dynamic Partial Reconfiguration", Proceedings of the 15th Reconfigurable Architecture Workshop, Apr. 14, 2008, 8 pages.
Corbetta et al., "Two Novel Approaches to Online Partial Bitstream Relocation in a Dynamically Reconfigurable System", Proceedings of IEEE Computer Society Annual Symposium on VLSI, Mar. 9, 2007, 2 pages.
Eguro et al., "FPGAS for Trusted Cloud Computing", Proceedings of the International Conference on Field-Programmable Logic and Applications, Aug. 2012, 8 pages.
Emmert et al., "Online Fault Tolerance for FPGA Logic Blocks", IEEE Transactions on Very Large Scale Integration (VLSI) Systems, vol. 15, Issue 2, Feb. 2007, pp. 216-226, 11 pages.
Hammad et al, "Highly Expandable Reconfigurable Platform using Multi-FPGA based Boards", International Journal of Computer Applications, vol. 51, No. 12, Aug. 2012, pp. 15-20, 6 pages.

(56) References Cited

OTHER PUBLICATIONS

Harikrishna et al., "A Novel online Fault Reconfiguration of FPGA", Proceedings of the Indian Journal of Applied Research, vol. 3, Issue 8, Aug. 2013, pp. 195-198, 4 pages.
Jamuna et al., "Fault Tolerant Tecniques for Reconfigurable Devices: a brief Survey," International Journal of Application or Innovation in Engineering & Management, vol. 2, Issue 1, Jan. 2013, 6 pages.
Kearney et al., "Using Simulated Partial Dynamic Run-Time Reconfiguration to Share Embedded FPGA Compute and Power Resources across a Swarm of Unpiloted Airborne Vehicles", Proceedings of EURASIP Journal of Embedded Systems, vol. 2007, Feb. 21, 2007, 12 pages.
Kohn, Christian, "Partial Reconfiguration of a Hardware Accelerator on Zynq-7000 All Programmable SoC Devices", Application Note: Zynq-7000 All Prgrammable SoC, vol. XAPP1159, No. UG1159, Jan. 21, 2013, 19 pages.
Krieg et al., "Run-Time FPGA Health Monitoring using Power Emulation Techniques," Proceedings of the IEEE 54th International Midwest Symposium on Circuits and Systems, Aug. 7, 2011, 4 pages.
Machidon et al., "Cloud Perspective on Reconfigurable Hardware", Review of the Air Force Academy, 2013, 6 pages.
Madhavapeddy et al., "Reconfigurable Data Processing for Clouds," Proceedings IEEE International Symposium on Field-Programmable Custom Computing Machines, May 1, 2011, 5 pages.
Mamiit, Aaron, "Intel develops hybrid Xeon-FPGA chip for cloud services", Jun. 20, 2014, retrieved at <<http://www.techtimes.com/articles/8794/20140620/intel-develops-hybrid-xeon-fpga-chip-for-cloud-services.htm>>, 4 pages.
McLoughlin et al., "Achieving Low-cost High-reliability Computation Through Redundant Parallel Processing," Proceedings of International Conference on Computing & Informatics, IEEE, Jun. 6, 2006, 6 pages.
Mershad et al., "A Framework for Multi-cloud Cooperation with Hardware Reconfiguration Support", Proceedings of IEEE Ninth World Congress on Services, Jun. 28, 2013, pp. 52-59, 8 pages.
Mesquita et al., "Remote and Partial Reconfiguration of FPGAs: tools and trends", Proceedings of the International Parallel and Distributed Processing Symposium, Apr. 22, 2003, 8 pages.
Mysore et al., "PortLand: A Scalable Fault-Tolerant Layer 2 Data Center Network Fabric," SIGCOMM '09, Aug. 17-21, 2009, 12 pages.
Paulsson et al., "Exploitation of Run-Time Partial Reconfiguration for Dynamic Power Management in Xilinx Spartan III-based Systems", Proceedings of the 3rd International Workshop on Reconfigurable Communication-centric Systems-on-Chip, Jun. 2007, 6 pages.
Raaijmakers et al., "Run-Time Partial Reconfiguration for Removal, Placement and Routing on the Virtex-II Pro", Proceedings of the International Conference on Field Programmable Logic and Applications, Aug. 27, 2007, 5 pages.
Rana et al., "Partial Dynamic Reconfiguration in a Multi-FPGA Clustered Architecture Based on Linux", Proceedings of the IEEE International Parallel and Distributed Processing Symposium, Mar. 26, 2007, 8 pages.
Rath, John, "Microsoft Working on Re-configurable Processors to Accelerate Bing Search", Jun. 27, 2014, retrieved at <<http://www.datacenterknowledge.com/archives/2014/06/27/programmable-fpga-chips-coming-to-microsoft-data-centers/>>, 3 pages.
Rehman et al., "Test and Diagnosis of FPGA Cluster Using Partial Reconfiguration", Proceedings of the 10th Conference on Ph.D. Research in Microelectronics and Electronics, Jun. 30, 2014, 4 pages.
Saldana et al., "TMD-MPI: An MPI Implementation for Multiple Processors Across Multiple FPGAs", Proceedings of the International Conference on Field Programmable Logic and Applications, Aug. 28, 2006, 6 pages.
Singh, Satnam, "Computing without Processors," Proceedings of ACM Computer Architecture, vol. 9, Issue 6, Jun. 27, 2011, 15 pages.
Straka et al., "Modern Fault Tolerant Architectures Based on Partial Dynamic Reconfiguration in FPGAs", IEEE 13th International Symposium on Design and Diagnostics of Electronic Circuits and Systems, Apr. 16, 2010, pp. 173-176, 4 pages.
Wilson, Richard, "Big FPGA design moves to the cloud", Jun. 11, 2013, retrieved at <<http://www.electronicsweekly.com/news/components/programmable-logic-and-asic/big-fpga-design-moves-to-the-cloud-2013-06/>>, 6 pages.
Wittig et al., "OneChip: An FPGA Processor With Reconfigurable Logic", Department of Computer and Electrical Engineering, University of Toronto, IEEE, Apr. 17-19, 1996, 10 pages.
International Search Report and Written Opinion mailed Jun. 20, 2016 from PCT Patent Application No. PCT/US2016/026284, 13 pages.
Demand and Response filed Aug. 3, 2016 from PCT Patent Application No. PCT/US2016/026284, 18 pages.
Non-Final Office Action mailed Aug. 11, 2016 from U.S. Appl. No. 14/752,785, 29 pages.
Demand and Response filed Aug. 17, 2016 from PCT Patent Application No. PCT/US2016/026286, 19 pages.
International Search Report and Written Opinion mailed Jun. 20, 2016 from PCT Patent Application No. PCT/US2016/026290, 12 pages.
Demand and Response filed Aug. 1, 2016 from PCT Patent Application No. PCT/US2016/026290, 19 pages.
International Search Report and Written Opinion mailed Jun. 20, 2016 from PCT Patent Application No. PCT/US2016/026293, 10 pages.
Demand and Response filed Jul. 27, 2016 from PCT Patent Application No. PCT/US2016/026293, 13 pages.
Kachris et al., "A Configurable MapReduce Accelerator for Multi-core FPGAs," abstract from FPGA'14, Proceedings of the 2014 ACM/SIGDA International Symposium on Field-programmable Gate Arrays, Feb. 26-28, 2014, 1 page.
International Search Report and Written Opinion mailed Sep. 16, 2016 from PCT Patent Application No. PCT/US2016/038837, 18 pages.
International Search Report and Written Opinion mailed Sep. 5, 2016 from PCT Patent Application No. PCT/US2016/038838, 12 pages.
International Search Report and Written Opinion mailed Sep. 28, 2016 from PCT Patent Application No. PCT/US2016/038841, 18 pages.
Demand and Response filed Aug. 10, 2016 from PCT Patent Application No. PCT/US2016/026087, 7 pages.
Second Written Opinion mailed Oct. 14, 2016 from PCT Patent Application No. PCT/US2016/026286, 9 pages.
Response filed Dec. 12, 2016 to the Non-Final Office Action mailed Nov. 7, 2016 to U.S. Appl. No. 14/717,752, 17 pages.
U.S. Appl. No. 62/149,311 titled "Reassinging Service Functionality Between Acceleration Components" filed Apr. 17, 2015 by Inventors Heil et al., 62 pages.
Notice of Allowance mailed Oct. 27, 2016 from U.S. Appl. No. 14/752,782, 20 pages.
U.S. Appl. No. 62/149,308 titled "Reconfiguring Acceleration Components of a Composed Service" filed Apr. 17, 2015 by Inventors Lanka et al., 57 pages.
U.S. Appl. No. 62/149,305 titled "Restoring Service Functionality at Acceleration Components" filed Apr. 17, 2015 by Inventors Heil et al., 66 pages.
U.S. Appl. No. 62/149,303 titled "Changing Between Difference Programmed Functionalities at an Acceleration Component" filed Apr. 17, 2015 by Inventors Putnam et al., 63 pages.
Inta et al., "The 'Chimera': An Off-The-Shelf CPU/GPU/FPGA Hybrid Computing Platform", International Journal of Reconfigurable Computing, vol. 2012, Article ID 241439, 2012, 10 pages.
Supplemental Amendment/Response filed May 1, 2017 to the Advisory Action mailed Apr. 5, 2017 from U.S. Appl. No. 14/717,752, 12 pages.

(56) References Cited

OTHER PUBLICATIONS

Final Office Action mailed May 2, 2017 from U.S. Appl. No. 14/717,788, 36 pages.
Response filed Mar. 13, 2017 to the Non-Final Office Action mailed Jan. 27, 2017 from U.S. Appl. No. 14/717,721, 15 pages.
Final Office Action mailed Apr. 5, 2017 from U.S. Appl. No. 14/717,721, 33 pages.
After Final Consideration Pilot Program Request filed Mar. 13, 2017 with Response to the Final Office Action mailed Feb. 9, 2017 from U.S. Appl. No. 14/717,752, 17 pages.
Advisory Action and After Final Consideration Pilot Program Decision mailed Apr. 5, 2017 from U.S. Appl. No. 14/717,752, 4 pages.
Response filed Mar. 13, 2017 to the Non-Final Office Action mailed Jan. 25, 2017 from U.S. Appl. No. 14/717,788, 13 pages.
Caulfield et al., "A Cloud-Scale Acceleration Architecture", Microarchitecture (MICRO), 49th Annual IEEE/ACM International Symposium, Oct. 15-19, 2016, 13 pages.
Kim et al., "Polymorphic On-Chip Networks", ISCA'08, 35th International Sumposium on Computer Architecture, IEEE 2008, 12 pages.
Papadimitriou et al., "Performance of Partial Reconfiguration in FPGA Systems; A Survey and a Cost Model", ACM Transactions on Reconfigurable Technology and Systems (TRETS), vol. 4, No. 4, Article 36, Dec. 2011, 24 pages.
Tan et al., "A Case for FAME: FPGA Architecture Model Execution", ACM SIGARCH, Computer Architecture News, vol. 38, No. 3, Jun. 19-23, 2010, pp. 290-301, 12 pages.
Amendment and Response filed Dec. 22, 2016 to the Notice of Allowance mailed Oct. 27, 2016 from U.S. Appl. No. 14/752,782, 20 pages.
Non-Final Office Action mailed Jan. 27, 2017 from U.S. Appl. No. 14/717,721, 86 pages.
Notice of Allowance mailed Jan. 30, 2017 from U.S. Appl. No. 14/752,782, 13 pages.
Amendment "A" and Response filed Jan. 6, 2017 to the Non-Final Office Action mailed Aug. 11, 2016 from U.S. Appl. No. 14/752,785, 13 pages.
Final Office Action mailed Feb. 9, 2017 to U.S. Appl. No. 14/717,752, 26 pages.
Non-Final Office Action mailed Jan. 25, 2017 from U.S. Appl. No. 14/717,788, 81 pages.
Non-Final Office Action mailed Feb. 2, 2017 from U.S. Appl. No. 14/752,778, 23 pages.
Non-Final Office Action mailed Feb. 10, 2017 from U.S. Appl. No. 14/752,802, 28 pages.
Final Office Action and Examiner-Initiated Interview Summary dated May 16, 2017 from U.S. Appl. No. 14/752,785, 22 pages.
Notice of Allowability and Applicant-Initiated Interview Summary dated May 12, 2017 from U.S. Appl. No. 14/717,752, 18 pages.
Non-Final Office Action dated May 9, 2017 from U.S. Appl. No. 14/752,793, 21 pages.
Amendment "A" and Response filed May 19, 2017 to the Non-Final Office Action dated Feb. 10, 2017 from U.S. Appl. No. 14/752,802, 12 pages.
Response filed Jul. 26, 2017 to the Final Office Action dated Apr. 5, 2017 from U.S. Appl. No. 14/717,721, 16 pages.
Supplemental Notice of Allowability dated May 31, 2017 from U.S. Appl. No. 14/717,752, 13 pages.
Supplemental Notice of Allowability dated Jun. 15, 2017 from U.S. Appl. No. 14/717,752, 6 pages.
Response filed Jul. 31, 2017 to the Final Office Action dated May 2, 2017 from U.S. Appl. No. 14/717,788, 14 pages.
Amendment "A" and Response filed Jul. 20, 2017 to the Non-Final Office Action dated May 9, 2017 from U.S. Appl. No. 14/752,800, 15 pages.
Amendment "A" and Response filed Jun. 20, 2017 to the Non-Final Office Action dated Feb. 2, 2017 from U.S. Appl. No. 14/752,778, 13 pages.
Final Office Action dated Jul. 7, 2017 from U.S. Appl. No. 14/752,802, 18 pages.
International Preliminary Report on Patentability dated May 24, 2017 from PCT Patent Application No. PCT/US2016/026286, 11 pages.
Notice of Allowance dated Aug. 30, 2017 from U.S. Appl. No. 14/717,752, 17 pages.
Non-Final Office Action dated Aug. 22, 2017 from U.S. Appl. No. 14/717,788, 40 pages.
Non-Final Office Action dated Aug. 11, 2017 from U.S. Appl. No. 14/752,793, 23 pages.
Notice of Allowance and Examiner-Initiated Interview Summary dated Aug. 25, 2017 from U.S. Appl. No. 14/752,788, 15 pages.

(FROM A HOST COMPONENT)

DATA PROCESSING SYSTEM HAVING A HARDWARE ACCELERATION PLANE AND A SOFTWARE PLANE

This application claims the benefit of U.S. Provisional Application No. 62/149,488 (the '488 application), filed Apr. 17, 2015. The '488 application is incorporated by reference herein in its entirety.

BACKGROUND

The computing industry faces increasing challenges in its efforts to improve the speed and efficiency of software-driven computing devices, e.g., due to power limitations and other factors. Software-driven computing devices employ one or more central processing units (CPUs) that process machine-readable instructions in a conventional temporal manner. To address this issue, the computing industry has proposed using hardware acceleration components (such as field-programmable gate arrays (FPGAs)) to supplement the processing performed by software-driven computing devices. However, software-driven computing devices and hardware acceleration components are dissimilar types of devices having fundamentally different architectures, performance characteristics, power requirements, program configuration paradigms, interface features, and so on. It is thus a challenging task to integrate these two types of devices together in a manner that satisfies the various design requirements of a particular data processing environment.

SUMMARY

A data processing system is described herein that includes two or more software-driven host components. The two or more host components collectively provide a software plane. The data processing system also includes two or more hardware acceleration components (such as FPGA devices) that collectively provide a hardware acceleration plane. In one implementation, a common physical network allows the host components to communicate with each other, and which also allows the hardware acceleration components to communicate with each other. Further, the hardware acceleration components in the hardware acceleration plane include functionality that enables them to communicate with each other in a transparent manner without assistance from the software plane. Overall, the data processing system may be said to support two logical networks that share a common physical network substrate. The logical networks may interact with each other, but otherwise operate in an independent manner.

The above-summarized functionality can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
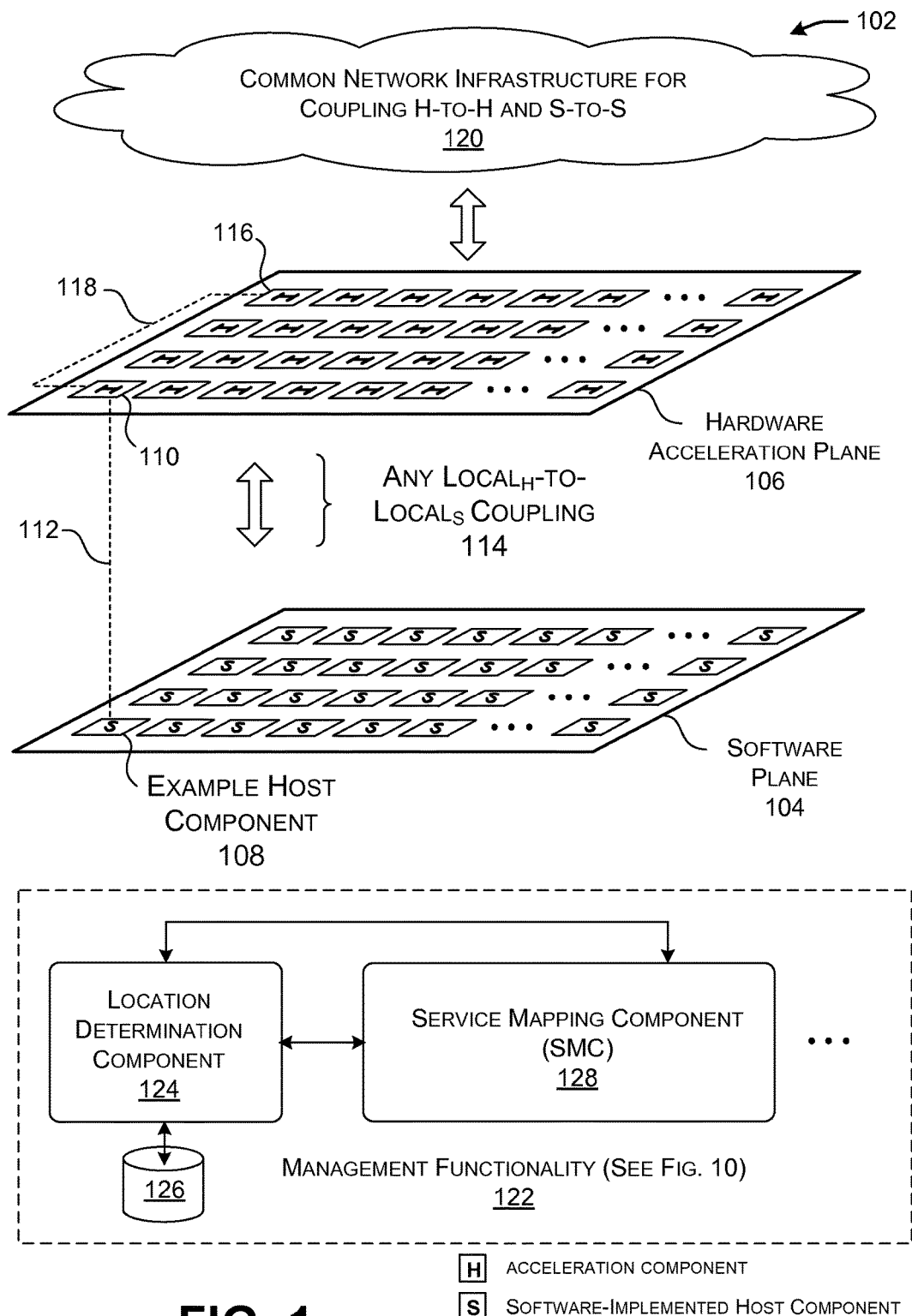
FIG. 1 shows an overview of a data processing system that includes a software plane and a hardware acceleration plane.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative data processing system that includes a hardware acceleration plane and a software plane. Section B describes management functionality that is used to manage the data processing system of Section A. Section C sets forth one implementation of an illustrative hardware acceleration component in the hardware acceleration plane.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Overview

FIG. 1 shows an overview of a data processing system 102 that includes a software plane 104 and a hardware acceleration plane 106. The software plane 104 includes a collection of software-driven components (each denoted by the symbol "S" in FIG. 1), while the hardware plane includes a collection of hardware acceleration components (each denoted by the symbol "H" in FIG. 1). For instance, each host component may correspond to a server computer that executes machine-readable instructions using one or more central processing units (CPUs). Each CPU, in turn, may execute the instructions on one or more hardware threads. Each hardware acceleration component, one the other hand, may correspond to hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), and so on.

The term "hardware" acceleration component is also intended to broadly encompass different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run on MPPAs of soft processors or the like; e) a case in which at least some tasks run as software on hard ASIC processors or the like, and so on, or any combination thereof. Likewise, the data processing system 102 can accommodate different manifestations of software-driven devices in the software plane 104.

To simplify repeated reference to hardware acceleration components, the following explanation will henceforth refer to these devices as simply "acceleration components." Further, the following explanation will present a primary example in which the acceleration components correspond to FPGA devices, although, as noted, the data processing system 102 may be constructed using other types of acceleration components. Further, the hardware acceleration plane 106 may be constructed using a heterogeneous collection of acceleration components, including different types of FPGA devices having different respective processing capabilities and architectures, a mixture of FPGA devices and other devices, and so on.

A host component generally performs operations using a temporal execution paradigm, e.g., by using each of its CPU hardware threads to execute machine-readable instructions, one after the after. In contrast, an acceleration component may perform operations using a spatial paradigm, e.g., by using a large number of parallel logic elements to perform computational tasks. Thus, an acceleration component can perform some operations in less time compared to a software-driven host component. In the context of the data processing system 102, the "acceleration" qualifier associated with the term "acceleration component" reflects its potential for accelerating the functions that are performed by the host components.

In one example, the data processing system 102 corresponds to a data center environment that includes a plurality of computer servers. The computer servers correspond to the host components in the software plane 104 shown in FIG. 1. In other cases, the data processing system 102 corresponds to an enterprise system. In other cases, the data processing system 102 corresponds to a user device or appliance which uses at least one host component that has access to two or more acceleration components, etc. These examples are cited by way of example, not limitation; still other applications are possible.

In one implementation, each host component in the data processing system 102 is coupled to at least one acceleration component through a local link. That fundamental unit of processing equipment is referred to herein as a "server unit component" because that equipment may be grouped together and maintained as a single serviceable unit within the data processing system 102 (although not necessarily so). The host component in the server unit component is referred to as the "local" host component to distinguish it from other host components that are associated with other server unit components. Likewise, the acceleration component(s) of the server unit component are referred to as the "local" acceleration component(s) to distinguish them from other acceleration components that are associated with other server unit components.

For example, FIG. 1 shows an illustrative local host component 108 that is coupled to a local acceleration component 110 through a local link 112 (such as, as will be described below, a Peripheral Component Interconnect Express (PCIe) link). That pairing of the local host component 108 and the local acceleration component 110 forms at least part of a single server unit component. More generally, FIG. 1 shows that the software plane 104 is coupled to the hardware acceleration plane through many individual local links, which FIG. 1 collectively refers to as a local$_H$-to-local$_S$ coupling 114.

The local host component 108 may further indirectly communicate with any other remote acceleration component in the hardware acceleration plane 106. For example, the local host component 108 has access to a remote acceleration component 116 via the local acceleration component 110. More specifically, the local acceleration component 110 communicates with the remote acceleration component 116 via a link 118.

In one implementation, a common network 120 is used to couple host components in the software plane 104 to other host components, and to couple acceleration components in the hardware acceleration plane 106 to other acceleration components. That is, two host components may use the same network 120 to communicate with each other as do two acceleration components. As another feature, the interaction among host components in the software plane 104 is independent of the interaction among acceleration components in the hardware acceleration plane 106. This means, for instance, that two or more acceleration components may communicate with each other in a transparent manner from the perspective of host components in the software plane 104, outside the direction of the host components, and without the host components being "aware" of the particular interactions that are taking place in the hardware acceleration plane 106. A host component may nevertheless initiate interactions that take place in the hardware acceleration plane 106 by issuing a request for a service that is hosted by the hardware acceleration plane 106.

According to one non-limiting implementation, the data processing system 102 uses the Ethernet protocol to transmit IP packets over the common network 120. In one implementation, each local host component in a server unit component is given a single physical IP address. The local acceleration component in the same server unit component may adopt the same IP address. The server unit component can determine whether an incoming packet is destined for the local host component as opposed to the local acceleration component in different ways. For example, packets that are destined for the local acceleration component can be formulated as user datagram protocol (UDP) packets specifying a specific port; host-destined packets, on the other hand, are not formulated in this way. In another case, packets belonging to the acceleration plane 106 can be distinguished from packets belonging to the software plane 104 based on the value of a status flag in each of the packets (e.g., in the header or body of a packet).

In view of the above characteristic, the data processing system 102 may be conceptualized as forming two logical networks that share the same physical communication links. The packets associated with the two logical networks may be distinguished from each other by their respective traffic classes in the manner described above. But in other implementations (e.g., as described below with respect to FIG. 8), the data processing system 102 may use two distinct physical networks to handle host-to-host traffic and hardware-to-hardware traffic, respectively. Further, in implementations that do use the common network 120, the host-to-host network infrastructure need not be entirely identical to the hardware-to-hardware network infrastructure; that is, these two infrastructures are common in the sense that most of their network resources are shared, but not necessarily all of their network resources are shared.

Finally, management functionality 122 serves to manage the operations of the data processing system 102. As will be set forth in greater detail in Section B (below), the management functionality 122 can be physically implemented using different control architectures. For example, in one control architecture, the management functionality 122 may include plural local management components that are coupled to one or more global management components.

By way of introduction to Section B, the management functionality 122 can include a number of sub-components that perform different respective logical functions (which can be physically implemented in different ways). A location determination component 124, for instance, identifies the current locations of services within the data processing system 102, based on current allocation information stored in a data store 126. As used herein, a service refers to any function that is performed by the data processing system 102. For example, one service may correspond to an encryption function. Another service may correspond to a document ranking function. Another service may correspond to a data compression function, and so on.

In operation, the location determination component 124 may receive a request for a service. In response, the location determination component 124 returns an address associated with the service, if that address is present in the data store 126. The address may identify a particular acceleration component that hosts the requested service.

A service mapping component (SMC) 128 maps services to particular acceleration components. The SMC 128 may operate in at least two modes depending on the type of triggering event that it receives which invokes it operation. In a first case, the SMC 128 processes requests for services made by instances of tenant functionality. An instance of tenant functionality may correspond to a software program running on a particular local host component, or, more specifically, a program executing on a virtual machine that, in turn, is associated with the particular local host component. That software program may request a service in the course of its execution. The SMC 128 handles the request by determining an appropriate component (or components) in the data processing system 102 to provide the service. Possible components for consideration include: a local acceleration component (associated with the local host component from which the request originated); a remote acceleration component; and/or the local host component itself (whereupon the local host component will implement the service in software). The SMC 128 makes its determinations based on one or more mapping considerations, such as whether the requested service pertains to a line-rate service.

In another manner of operation, the SMC 128 generally operates in a background and global mode, allocating services to acceleration components based on global conditions in the data processing system 102 (rather than, or in addition to, handling individual requests from instances of tenant functionality). For example, the SMC 128 may invoke its allocation function in response to a change in demand that affects one or more services. In this mode, the SMC 128 again makes its determinations based on one or more mapping considerations, such as the historical demand associated with the services, etc.

The SMC 128 may interact with the location determination component 124 in performing its functions. For instance, the SMC 128 may consult the data store 126 when it seeks to determine the address of an already allocated service provided by an acceleration component. The SMC 128 can also update the data store 126 when it maps a service to one or more acceleration components, e.g., by storing the addresses of those acceleration components in relation to the service.

Although not shown in FIG. 1, a sub-component of the SMC 128 also manages multi-component services. A multi-component service is a service that is composed of plural parts. Plural respective acceleration components perform the respective parts.

Note that FIG. 1 illustrates, as a matter of convenience, that the management functionality 122 is separate from the components in the software plane 104 and the hardware plane 106. But as will be clarified in Section B, any aspect of the management functionality 122 can be implemented using the resources of the software plane 104 and/or the hardware plane 106. When implemented by the hardware plane 106, the management functions can be accelerated like any service.

Figure 2:
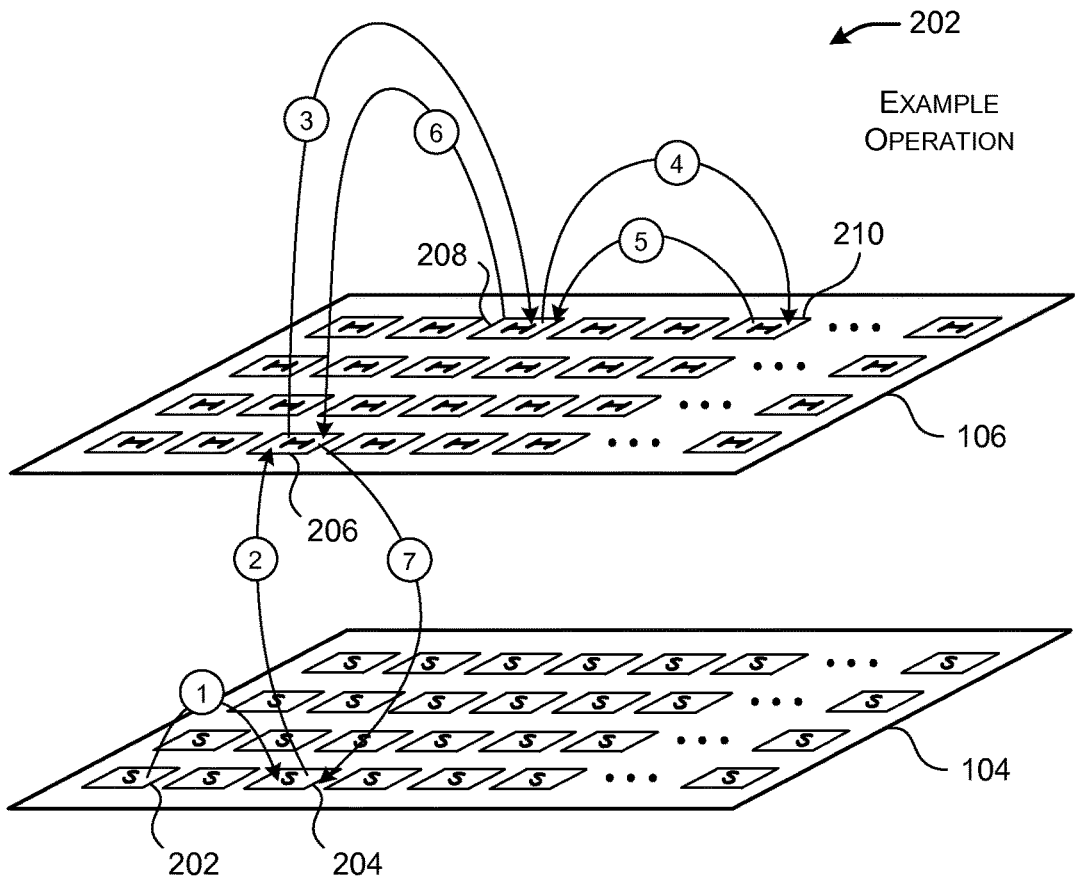
FIG. 2 shows a first example of the operation of the data processing system of FIG. 1.

FIG. 2 shows a first example of the operation of the data processing system 102 of FIG. 1, corresponding to a single transaction, or part of a single transaction. In operation (1), a first host component 202 communicates with a second host component 204 in the course of performing a single computational task. The second host component 204 then requests the use of a service that is implemented in the hardware acceleration plane 106 (although the second host component 204 may not be "aware" of where the service is implemented, beyond that the service can be accessed at a specified address).

In many cases, a requested service is implemented on a single acceleration component (although there may be plural redundant such acceleration components to choose from among). But in the particular example of FIG. 2, the requested service corresponds to a multi-component service that is spread out over a collection (or cluster) of acceleration components, each of which performs an allocated part of the service. A graph structure may specify the manner by which the individual acceleration components are coupled together in the collection. In some implementations, the graph structure also identifies at least one head component. The head component corresponds to a point of contact by which entities in the data processing system 102 may interact with the multi-component service in the hardware acceleration plane 106. The head component may also serve as an initial processing stage in a processing pipeline defined by the graph structure.

In the particular case of FIG. 2, assume that acceleration component 206 corresponds to the local acceleration component that is locally linked to the local host component 204, and that an acceleration component 208 is the head component of the multi-component service. In operations (2) and (3), the requesting host component 204 accesses the acceleration component 208 via its local acceleration component 206. The acceleration component 208 then performs its part of the multi-component service to generate an intermediate output result. In operation (4), the acceleration component 208 then invokes another acceleration component 210, which performs another respective part of the multi-component service, to generate a final result. In operations (5), (6), and (7), the hardware acceleration plane 106 successively forwards the final result back to the requesting host component 204, through the same chain of components set forth above but in the opposite direction. Note that the data flow operations described above, including the flow operations that define the return path, are cited by way of example, not limitation; other multi-component services may use other graph structures that specify any other flow paths. For example, the acceleration component 210 can forward the final result directly to the local acceleration component 206.

First, note that the operations that take place in the hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

Second, note that the hardware acceleration plane 106 performs its transactions in a manner that is transparent to a requesting host component. For example, the local host component 204 may be "unaware" of how its request is being processed in the hardware acceleration plane, including the fact that the service corresponds to a multi-component service.

Third, note that, in this implementation, the communication in the software plane 104 (e.g., corresponding to operation (1)) takes place using the same common network 120 as communication in the hardware acceleration plane 106 (e.g., corresponding to operations (3)-(6)). Operations (2) and (7) may take place over a local link, corresponding to the local$_H$-to-local$_S$ coupling 114 shown in FIG. 1.

The multi-component service shown in FIG. 2 resembles a ring in that a series of acceleration components are traversed in a first direction to arrive at a final result; that final result is then propagated back through the same series of acceleration components in the opposite direction to the head component. But as noted above, other multi-component services may use different collections of acceleration components having different respective flow structures.

Figure 3:
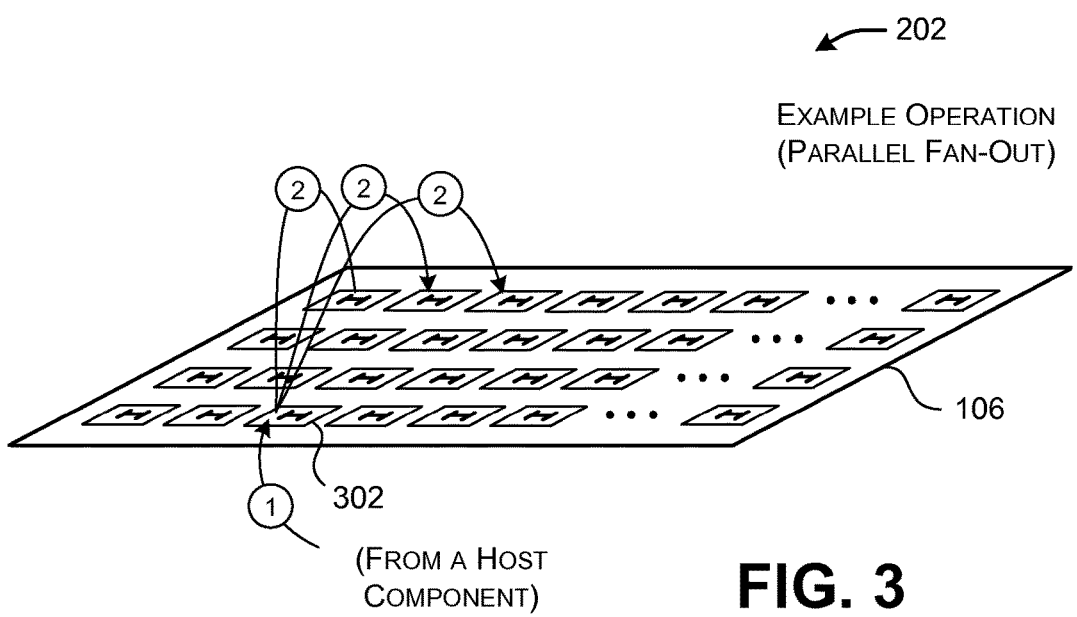
FIG. 3 shows a second example of the operation of the data processing system of FIG. 1.

For example, FIG. 3 shows a second example of the operation of the data processing system 102 of FIG. 1 that employs a different flow structure compared to the example of FIG. 1. More specifically, in operation (1), a local host component (not shown) sends a request to its local acceleration component 302. In this case, assume that the local acceleration component is also the head component of the service. In operation (2), the head component may then forward plural messages to plural respective acceleration components. Each acceleration component that receives the message may perform a part of the multi-component service in parallel with the other acceleration components. (Note that FIG. 3 may represent only a portion of a more complete transaction.)

Moreover, a multi-component service does not necessarily need to employ a single head component, or any head component. For example, a multi-component service can employ a cluster of acceleration components which all perform the same function. The data processing system 102 can be configured to invoke this kind of multi-component service by contacting any arbitrary member in the cluster. That acceleration component may be referred to as a head component because it is the first component to be accessed, but it otherwise has no special status. In yet other cases, a host component may initially distribute plural requests to plural members of a collection of acceleration components.

Figure 4:
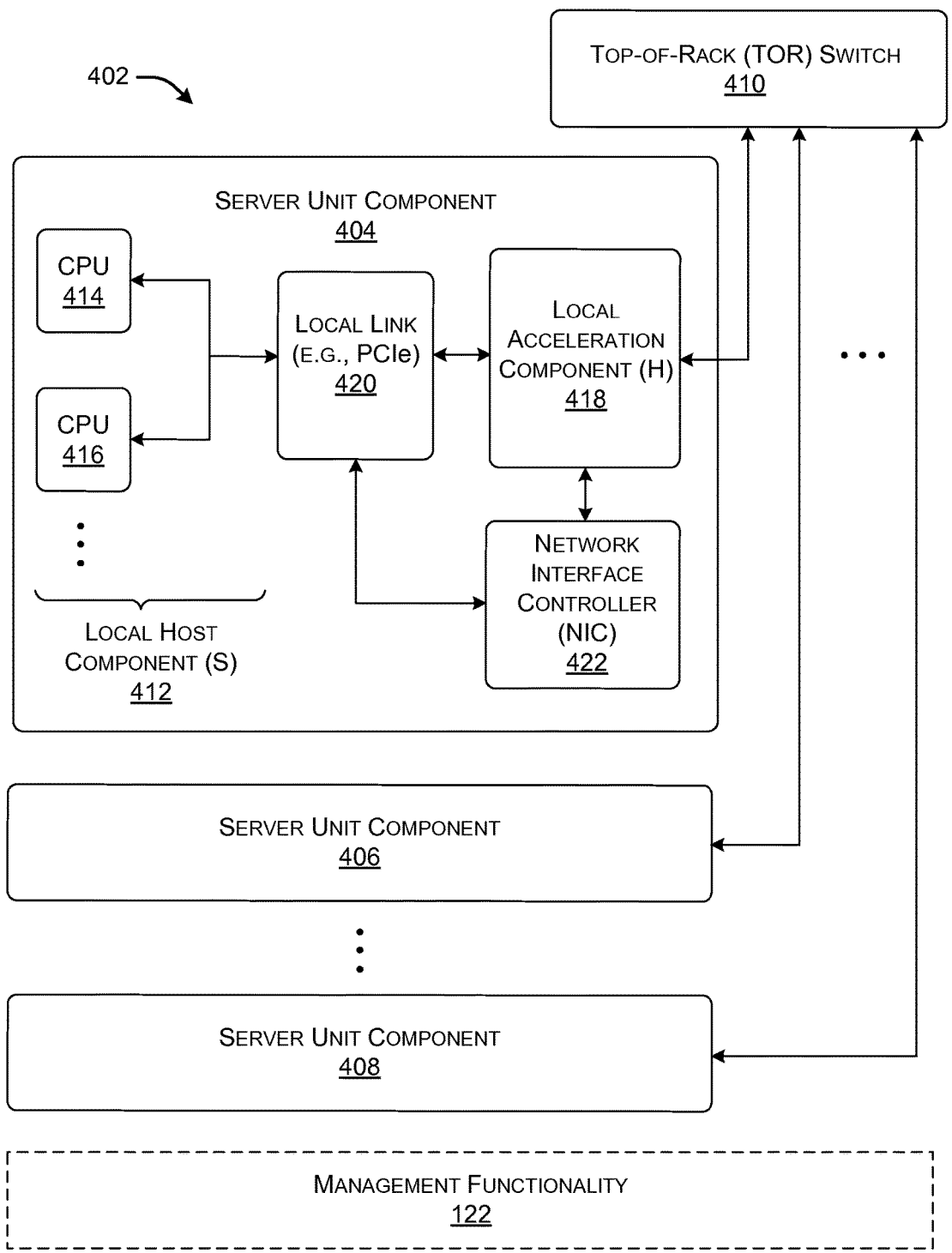
FIG. 4 shows one implementation of the data processing system of FIG. 1, corresponding to a data center.

FIG. 4 shows a portion of a data center 402 which represents one implementation of the data processing system 102 of FIG. 1. In particular, FIG. 4 shows one rack in that data center 402. The rack includes plural server unit components (404, 406, . . . , 408), each of which is coupled to a top-of-rack (TOR) switch 410. A top-of-rack switch refers to a switch which couples the components in a rack to other parts of a data center. Other racks, although not shown, may exhibit a similar architecture. A rack is a physical structure for housing or otherwise grouping plural processing components.

FIG. 4 also shows the illustrative composition of one representative server unit component 404. It includes a local host component 412 that includes one or more central processing units (CPUs) (414, 416, . . . ), together with a local acceleration component 418. The local acceleration component 418 is directly coupled to the host component 412 via a local link 420. The local link 420, for example, may be implemented as a PCIe link. The local acceleration component 418 is also indirectly coupled to the host component 412 by way of a network interface controller (NIC) 422.

Finally, note that the local acceleration component 418 is coupled to the TOR switch 410. Hence, in this particular implementation, the local acceleration component 418 represents the sole path through which the host component 412 interacts with other components in the data center 402 (including other host components and other acceleration components). Among other effects, the architecture of FIG. 4 allows the local acceleration component 418 to perform processing on packets that are received from (and/or sent to) the TOR switch 410 (e.g., by performing encryption, compression, etc.), without burdening the CPU-based operations performed by the host component 412.

Note that the local host component 412 may communicate with the local acceleration component 418 through the local link 420 or via the NIC 422. Different entities may leverage these two paths in different respective circumstances. For example, assume that a program running on the host component 412 requests a service. In one implementation, assume that the host component 412 provides a local instantiation of the location determination component 124 and the data store 126. Or a global management component may provide the location determination component 124 and its data store 126. In either case, the host component 412 may consult the data store 126 to determine the address of the service. The host component 412 may then access the service via the NIC 422 and the TOR switch 410, using the identified address.

In another implementation, assume that local acceleration component 418 provides a local instantiation of the location determination component 124 and the data store 126. The host component 412 may access the local acceleration component 418 via the local link 420. The local acceleration component 418 can then consult the local data store 126 to determine the address of the service, upon which it accesses the service via the TOR switch 410. Still other ways of accessing the service are possible.

Figure 5:
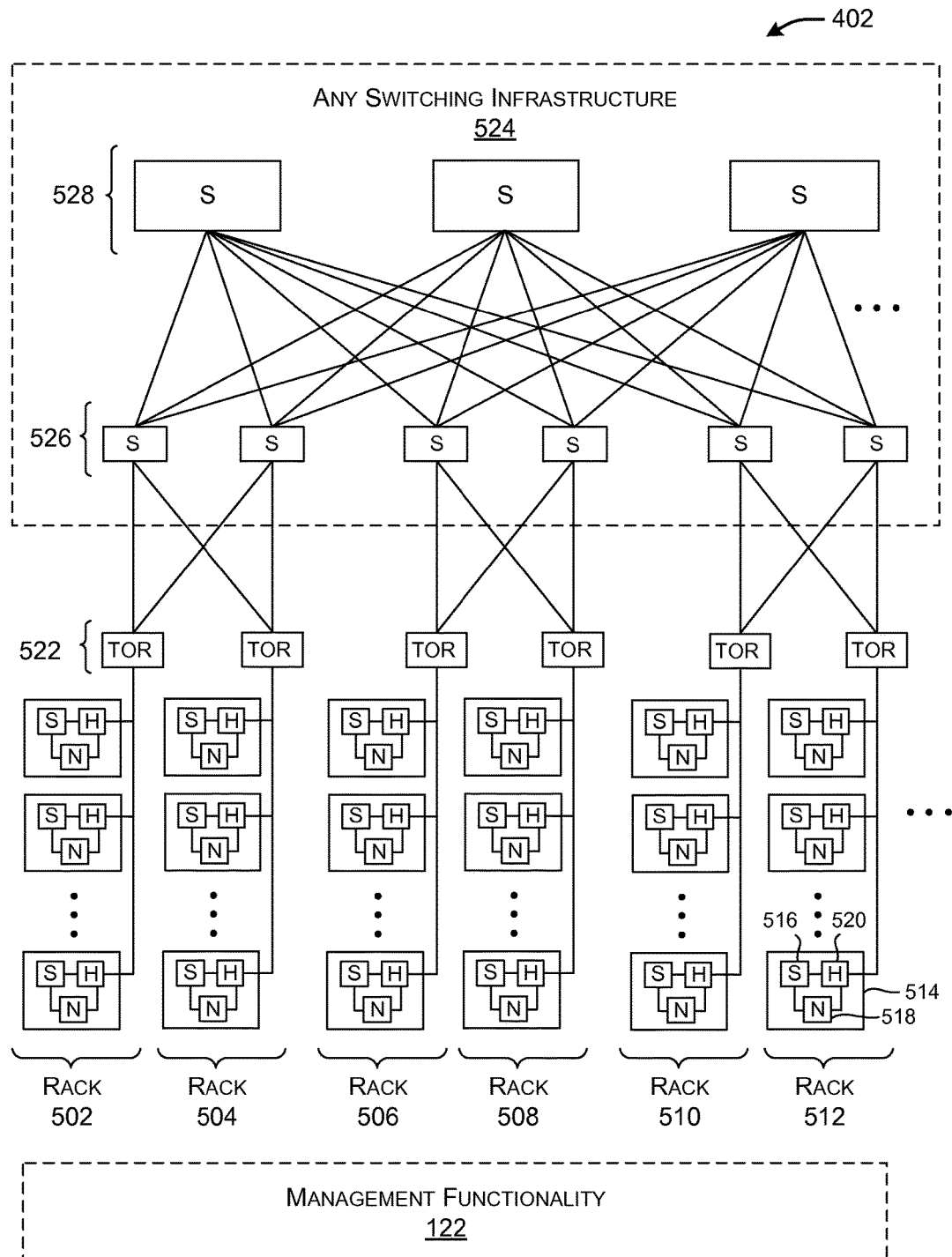
FIG. 5 is a more encompassing depiction of the data center implementation of FIG. 4.

FIG. 5 is a more encompassing depiction of the data center 402 shown in FIG. 4. The data center 402 includes a plurality of racks (502-512, . . . ). Each rack includes a plurality of server unit components. Each server unit component, in turn, may have the architecture described above in FIG. 4. For example, a representative server unit component 514 includes a local host component (S) 516, a network interface controller (N) 518, and a local acceleration component (S) 520.

The routing infrastructure shown in FIG. 5 corresponds to one implementation of the common network 120, described above with reference to FIG. 1. The routing infrastructure includes a plurality of top-of-rack (TOR) switches 522 and higher-level switching infrastructure 524. The higher-level switching architecture 524 connects the TOR switches 522 together. The higher-level switching infrastructure 524 can have any architecture, and may be driven by any routing protocol(s). In the illustrated example of FIG. 5, the higher-level switching infrastructure 524 includes at least a collection of aggregation switches 526, core switches 528, etc. The traffic routed through the illustrated infrastructure may correspond to Ethernet IP packets.

The data center 402 shown in FIG. 5 may correspond to a set of resources provided at a single geographic location, or a distributed collection of resources that are distributed over plural geographic locations (e.g., over plural individual contributing data centers located in different parts of the world). In a distributed context, the management functionality 122 can send work from a first contributing data center to a second contributing data center based on any mapping consideration(s), such as: (1) a determination that acceleration components are available at the second contributing data center; (2) a determination that acceleration components are configured to perform a desired service or services at the second contributing data center; and/or (3) a determination that the acceleration components are not only configured to performed a desired service or services, but they are immediately available (e.g., "online") to perform those services, and so on. As used herein, the term "global" generally refers to any scope that is more encompassing than the local domain associated with an individual server unit component.

Generally note that, while FIGS. 4 and 5 focus on the use of a relatively expansive data processing system (corresponding to a data center), some of the principles set forth herein can be applied to smaller systems, including a case in which a single local host component (or other type of component) is coupled to plural acceleration components, including a local acceleration component and one or more remote acceleration components. Such a smaller system may even be embodied in a user device or appliance, etc. The user device may have the option of using local acceleration resources and/or remote acceleration resources.

Figure 6:
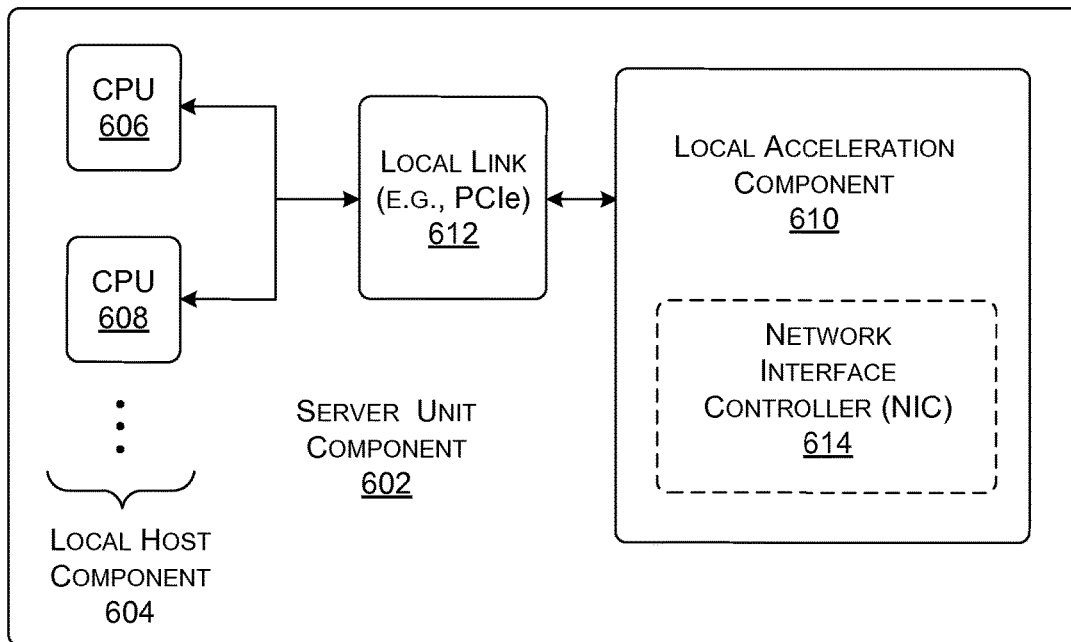
FIG. 6 shows an alternative way of implementing a server unit component, compared to that shown in FIG. 4.

FIG. 6 shows an alternative way of implementing a server unit component 602, compared to the architecture that shown in FIG. 4. Like the case of FIG. 4, the server unit component 602 of FIG. 6 includes a local host component 604 made up of one or more CPUs (606, 608, . . . ), a local acceleration component 610, and a local link 612 for coupling the local host component 604 with the local acceleration component 610. Unlike the case of FIG. 4, the server unit component 602 implements a network interface controller (NIC) 614 as an internal component of the local acceleration component 610, rather than as a separate component.

Figure 7:
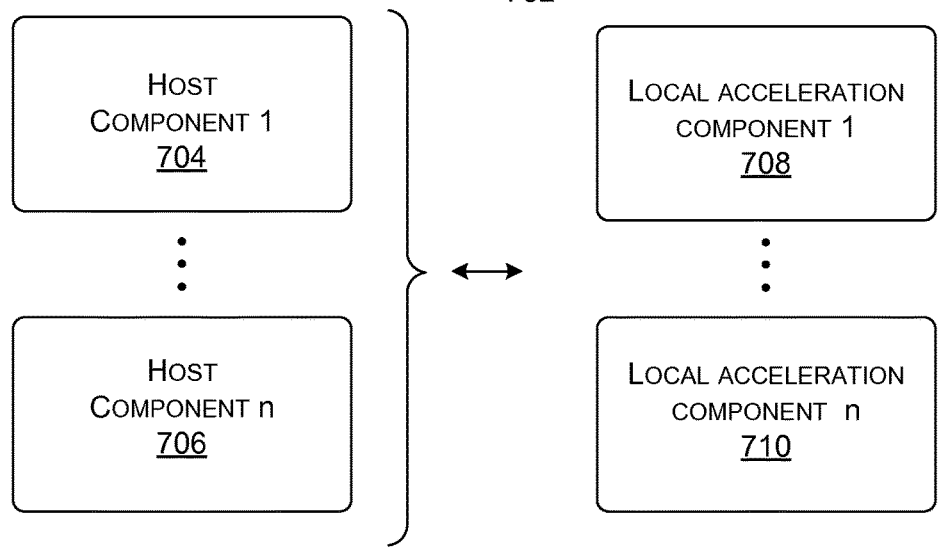
FIG. 7 shows yet another way of implementing a server unit component compared to that shown in FIG. 4.

FIG. 7 shows yet another alternative way of implementing a server unit component 702 compared to the architecture shown in FIG. 4. In the case of FIG. 7, the server unit component 702 includes any number n of local host components (704, . . . , 706) together with any number m of local acceleration components (708, . . . , 710). (Other components of the server unit component 702 are omitted from the figure to facilitate explanation.) For example, the server unit component 702 may include a single host component coupled to two local acceleration components. The two acceleration components can perform different respective tasks. For example, one acceleration component can be used to process outgoing traffic to its local TOR switch, while the other acceleration component can be used to process incoming traffic from the TOR switch. In addition, the server unit component 702 can load any services on any of the local acceleration components (708, . . . , 710).

Also note that, in the examples set forth above, a server unit component may refer to a physical grouping of components, e.g., by forming a single serviceable unit within a rack of a data center. In other cases, a server unit component may include one or more host components and one or more acceleration components that are not necessarily housed together in a single physical unit. In that case, a local acceleration component may be considered logically, rather than physically, associated with its respective local host component.

Alternatively, or in addition, a local host component and one or more remote acceleration components can be implemented on a single physical component, such as a single MPSoC-FPGA die. The network switch may also be incorporated into that single component.

Figure 8:
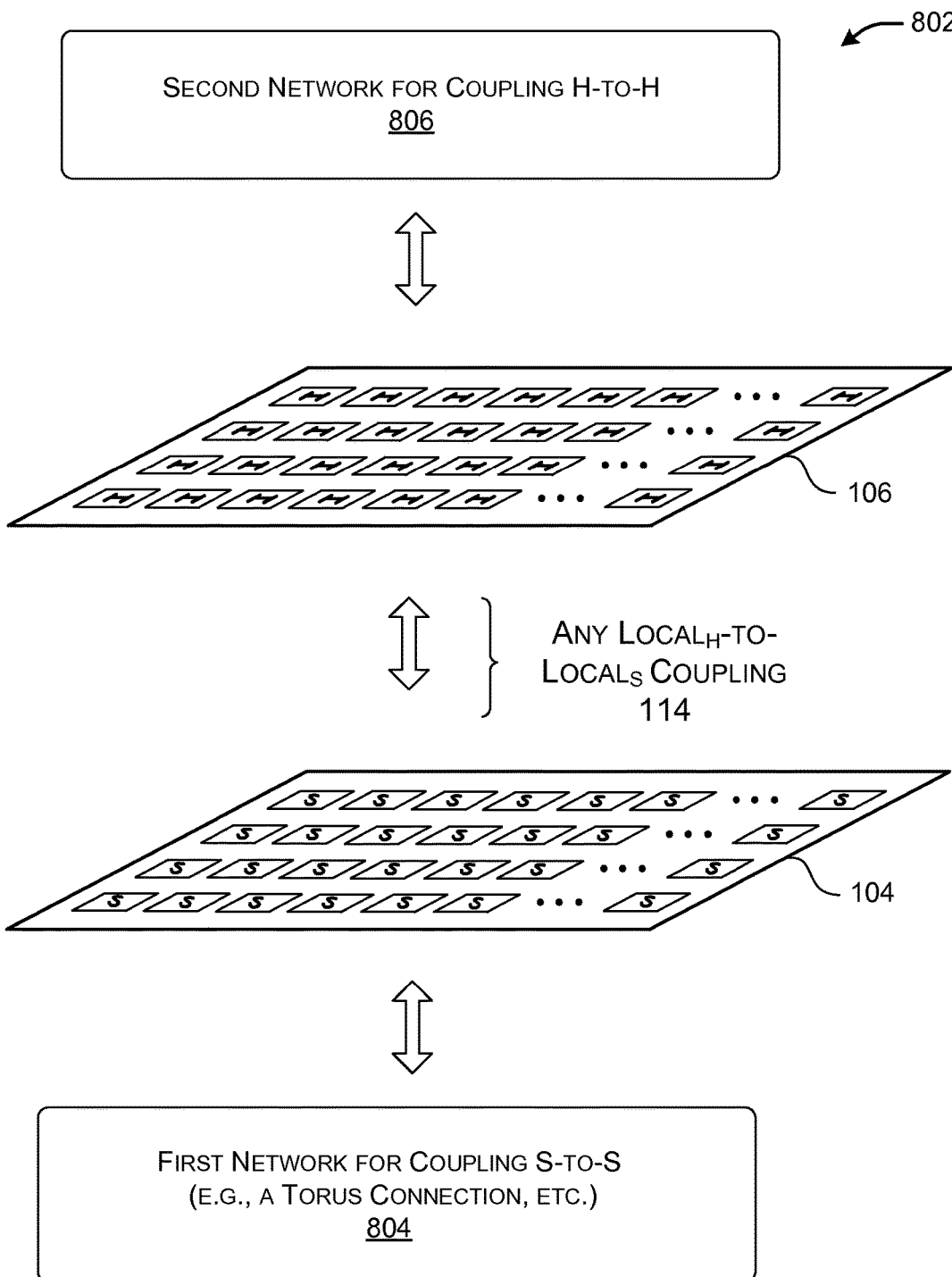
FIG. 8 shows an alternative data processing system compared to that shown in FIG. 1, e.g., which uses a different network infrastructure compared to that shown in FIG. 1.

FIG. 8 shows an alternative data processing system 802 compared to that shown in FIG. 1. Like the data processing system 102 of FIG. 1, the data processing system 802 includes a software plane 104 and a hardware acceleration plane 106, and a $local_H$-to-$local_S$ coupling 114 for connecting local host components to respective local acceleration components. But unlike the data processing system 102 of FIG. 1, the data processing system 802 includes a first network 804 for coupling host components together, and a second network 806 for coupling hardware components together, wherein the first network 804 differs from the second network 806, at least in part. For example, the first network 804 may correspond to the type of data center switching infrastructure shown in FIG. 5. The second network 806 may correspond to dedicated links for connecting the acceleration components together having any network topology. For example, the second network 806 may correspond to a p×r torus network. Each acceleration component in the torus network is coupled to east, west, north, and south neighboring acceleration components via appropriate cable links or the like. Other types of torus networks can alternatively be used having any respective sizes and dimensions.

In other cases, local hard CPUs, and/or soft CPUs, and/or acceleration logic provided by a single processing component (e.g., as implemented on a single die) may be coupled via diverse networks to other elements on other processing components (e.g., as implemented on other dies, boards, racks, etc.). An individual service may itself utilize one or more recursively local interconnection networks.

Further note that the above description was framed in the context of host components which issue service requests that are satisfied by acceleration components. But alternatively, or in addition, any acceleration component can also make a request for a service which can be satisfied by any other component, e.g., another acceleration component and/or even a host component. The SMC 102 can address such a request in a similar manner to that described above. Indeed, certain features described herein can be implemented on a hardware acceleration plane by itself, without a software plane.

More generally stated, certain features can be implemented by any first component which requests a service, which may be satisfied by the first component, and/or by one or more local components relative to the first component, and/or by one or more remote components relative to the first component. To facilitate explanation, however, the description below will continue to be framed mainly in the context in which the entity making the request corresponds to a local host component.

Figure 14:
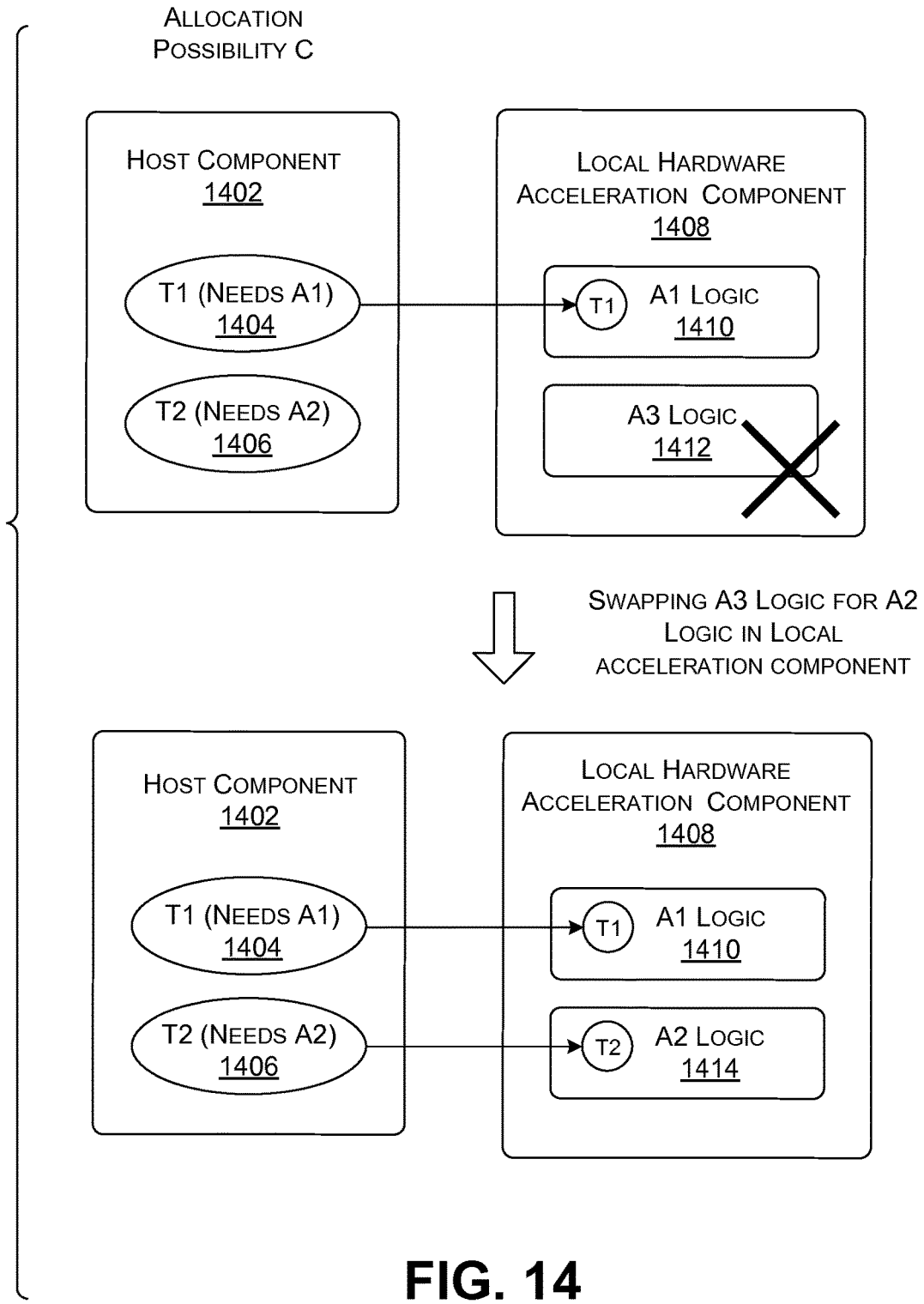

Finally, other implementations can adopt different strategies for coupling the host components to the hardware components, e.g., other than the $local_H$-to-$local_S$ coupling 114 shown in FIG. 14.

Figure 9:
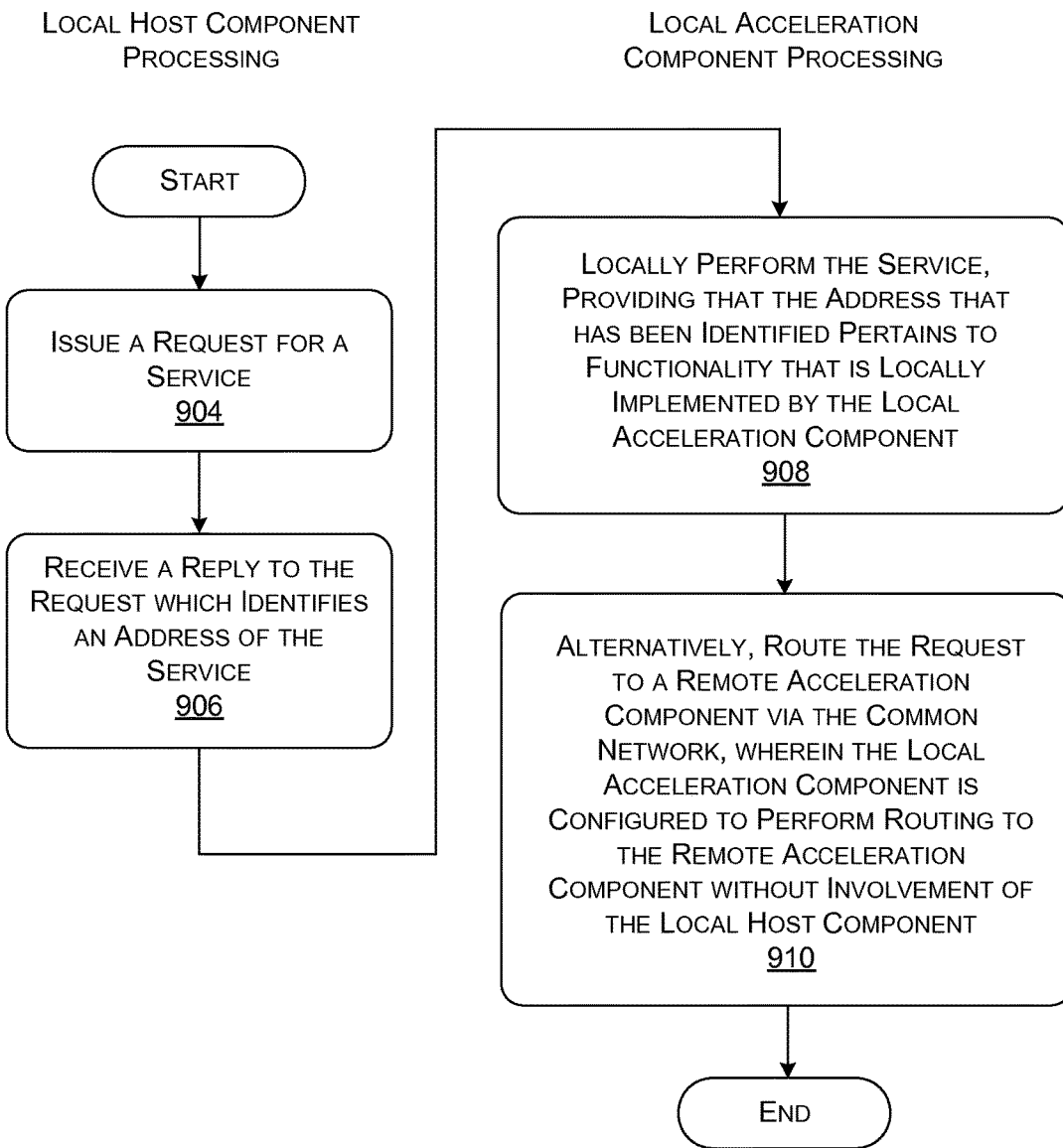
FIG. 9 is a flowchart that shows one manner of operation of the data processing system of FIG. 1.

FIG. 9 shows a process 902 which represents one illustrative manner of operation of the data processing system 102 of FIG. 1. In block 904, a local host component issues a request for a service. In block 906, the local host component receives a reply to the request which may identify an address of the service. In an alternative implementation, an associated local acceleration component may perform blocks 904 and 906 after receiving a request from the local host component. In other words, either the local host component or the local acceleration component can perform the address lookup function.

In block 908, the associated local acceleration component may locally perform the service, assuming that the address that has been identified pertains to functionality that is locally implemented by the local acceleration component. Alternatively, or in addition, in block 910, the local acceleration component routes the request to a remote acceleration component. As noted above, the local acceleration component is configured to perform routing to the remote acceleration component without involvement of the local host component. Further, plural host components communicate in the data processing system 102 with each other over a same physical network as do plural acceleration components.

In conclusion to Section A, the data processing system 102 has a number of useful characteristics. First, the data processing system 102 uses a common network 120 (except for the example of FIG. 8) that avoids the expense associated with a custom network for coupling acceleration components together. Second, the common network 120 makes it feasible to add an acceleration plane to an existing data processing environment, such as a data center. And after installation, the resultant data processing system 102 can be efficiently maintained because it leverages existing physical links found in the existing data processing environment. Third, the data processing system 102 integrates the acceleration plane 106 without imposing large additional power requirements, e.g., in view of the above-described manner in which local acceleration components may be integrated with existing server unit components. Fourth, the data processing system 102 provides an efficient and flexible mechanism for allowing host components to access any acceleration resources provided by the hardware acceleration plane 106, e.g., without narrowly pairing host components to specific fixed acceleration resources, and without burdening the host components with managing the hardware acceleration plane 106 itself. Fifth, the data processing system 102 provides an efficient mechanism for managing acceleration resources by intelligently dispersing these resources within the hardware plane 106, thereby: (a) reducing the overutilization and underutilization of resources (e.g., corresponding to the "stranded capacity" problem); (b) facilitating quick access to these services by consumers of these services; (c) accommodating heightened processing requirements specified by some consumers and/or services, and so on. The above effects are illustrative, rather than exhaustive; the data processing system 102 offers yet other useful effects.

B. Management Functionality

Figure 10:
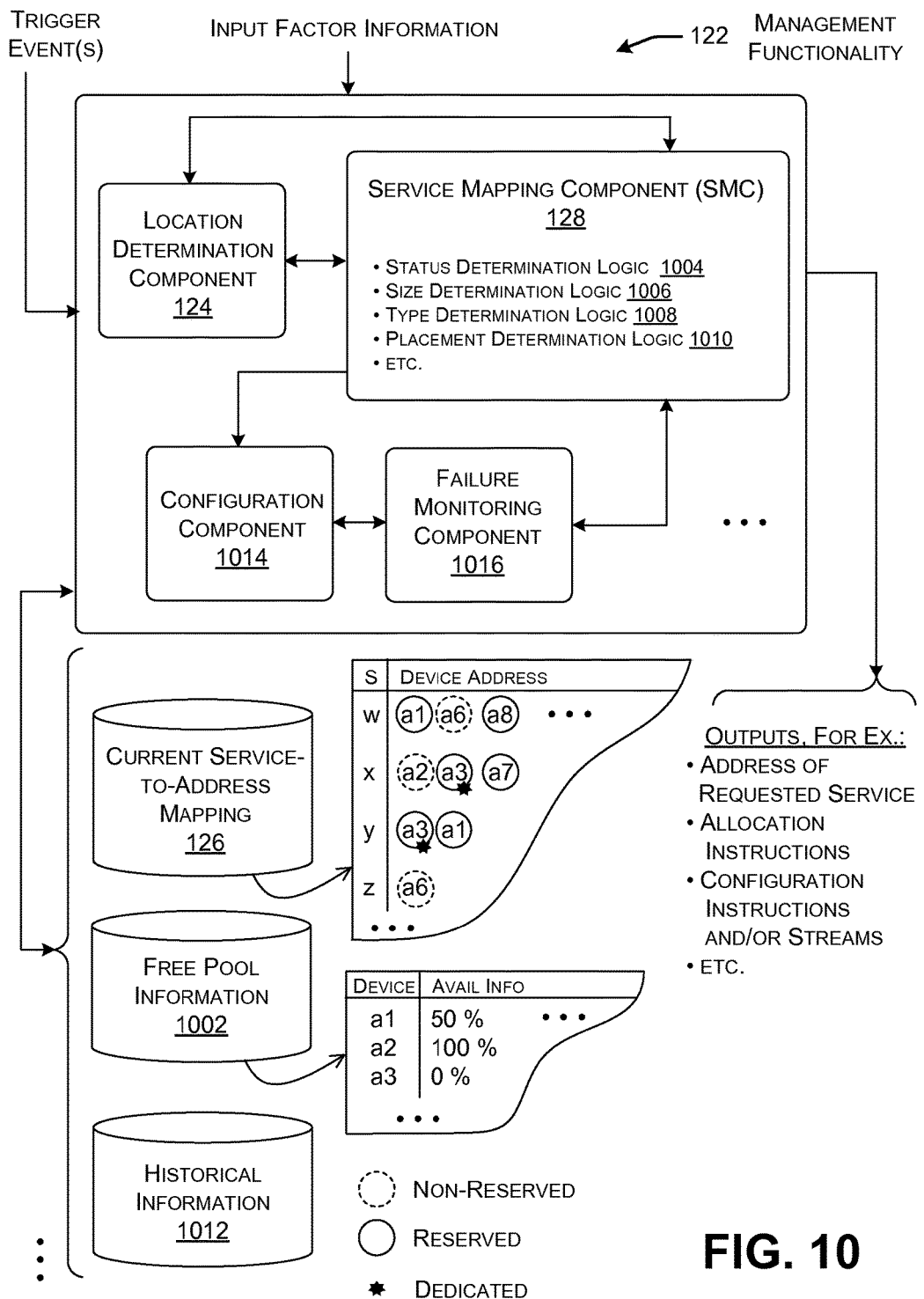
FIG. 10 shows an overview of one implementation of management functionality that is used to manage the data processing system of FIG. 1.

FIG. 10 shows an overview of one implementation of the management functionality 122 that is used to manage the data processing system 102 of FIG. 1. More specifically, FIG. 10 depicts a logical view of the functions performed by the management functionality 122, including its principal engine, the service mapping component (SMC) 128. Different sub-components correspond to different main functions performed by the management functionality 122. FIGS. 17-20, described below, show various possible physical implementations of the logical functionality.

As described in the introductory Section A, the location determination component 124 identifies the current location of services within the data processing system 102, based on current allocation information stored in the data store 126. In operation, the location determination component 124 receives a request for a service. In response, it returns an address of the service, if present within the data store 126. The address may identify a particular acceleration component that implements the service.

The data store 126 may maintain any type of information which maps services to addresses. In the small excerpt shown in FIG. 10, the data store 126 maps a small number of services (service w, service x, service y, and service z) to the acceleration components which are currently configured to provide these services. For example, the data store 126 indicates that a configuration image for service w is currently installed on devices having addresses a1, a6, and a8. The address information may be expressed in any manner. Here, the address information is represented in high-level symbolic form to facilitate explanation.

In some implementations, the data store 126 may optionally also store status information which characterizes each current service-to-component allocation in any manner. Generally, the status information for a service-to-component allocation specifies the way that the allocated service, as implemented on its assigned component (or components), is to be treated within the data processing system 102, such as by specifying its level of persistence, specifying its access rights (e.g., "ownership rights"), etc. In one non-limiting implementation, for instance, a service-to-component allocation can be designated as either reserved or non-reserved. When performing a configuration operation, the SMC 128 can take into account the reserved/non-reserved status information associated with an allocation in determining whether it is appropriate to change that allocation, e.g., to satisfy a current request for a service, a change in demand for one or more services, etc. For example, the data store 126 indicates that the acceleration components having address a1, a6, and a8 are currently configured to perform service w, but that only the assignments to acceleration components a1 and a8 are considered reserved. Thus, the SMC 128 will view the allocation to acceleration component a6 as a more appropriate candidate for reassignment (reconfiguration), compared to the other two acceleration components.

In addition, or alternatively, the data store 126 can provide information which indicates whether a service-to-component allocation is to be shared by all instances of tenant functionality, or dedicated to one or more particular instances of tenant functionality (or some other indicated consumer(s) of the service). In the former (fully shared) case, all instances of tenant functionality vie for the same resources provided by an acceleration component. In the latter (dedicated) case, only those clients that are associated with a service allocation are permitted to use the allocated acceleration component. FIG. 10 shows, in high-level fashion, that the services x and y that run on the acceleration component having address a3 are reserved for use by one or more specified instances of tenant functionality, whereas any instance of tenant functionality can use the other service-to-component allocations.

The SMC 128 may also interact with a data store 1002 that provides availability information. The availability information identifies a pool of acceleration components that have free capacity to implement one or more services. For example, in one manner of use, the SMC 128 may determine that it is appropriate to assign one or more acceleration components as providers of a function. To do so, the SMC 128 draws on the data store 1002 to find acceleration components that have free capacity to implement the function. The SMC 128 will then assign the function to one or more of these free acceleration components. Doing so will change the availability-related status of the chosen acceleration components.

The SMC 128 also manages and maintains the availability information in the data store 1002. In doing so, the SMC 128 can use different rules to determine whether an acceleration component is available or unavailable. In one approach, the SMC 128 may consider an acceleration component that is currently being used as unavailable, while an acceleration component that is not currently being used as available. In other cases, the acceleration component may have different configurable domains (e.g., tiles), some of which are being currently used and others which are not being currently used. Here, the SMC 128 can specify the availability of an acceleration component by expressing the fraction of its processing resources that are currently not being used. For example, FIG. 10 indicates that an acceleration component having address a1 has 50% of its processing resources available for use. On the other hand, an acceleration component having address a2 is completely available, while an acceleration component having an address a3 is completely unavailable. Individual acceleration components can notify the SMC 128 of their relative levels of utilization in different ways, as will be described in greater detail below.

In other cases, the SMC 128 can take into consideration pending requests for an acceleration component in registering whether it is available or not available. For example, the SMC 128 may indicate that an acceleration component is not available because it is scheduled to deliver a service to one or more instances of tenant functionality, even though it may not be engaged in providing that service at the current time.

In other cases, the SMC 128 can also register the type of each acceleration component that is available. For example, the data processing system 102 may correspond to a heterogeneous environment that supports acceleration components having different physical characteristics. The availability information in this case can indicate not only the identities of processing resources that are available, but also the types of those resources.

In other cases, the SMC 128 can also take into consideration the status of a service-to-component allocation when registering an acceleration component as available or unavailable. For example, assume that a particular acceleration component is currently configured to perform a certain service, and furthermore, assume that the allocation has been designated as reserved rather than non-reserved. The SMC 128 may designate that acceleration component as unavailable (or some fraction thereof as being unavailable) in view of its reserved status alone, irrespective of whether the service is currently being actively used to perform a function at the present time. In practice, the reserved status of an acceleration component therefore serves as a lock which prevents the SMC 128 from reconfiguring the acceleration component, at least in certain circumstances.

Now referring to the core mapping operation of the SMC 128 itself, the SMC 128 allocates or maps services to acceleration components in response to triggering events. More specifically, the SMC 128 operates in different modes depending on the type of triggering event that has been received. In a request-driven mode, the SMC 128 handles requests for services by tenant functionality. Here, each triggering event corresponds to a request by an instance of tenant functionality that resides, at least in part, on a particular local host component. In response to each request by a local host component, the SMC 128 determines an appropriate component to implement the service. For example, the SMC 128 may choose from among: a local acceleration component (associated with the local host component that made the request), a remote acceleration component, or the local host component itself (whereupon the local host component will implement the service in software), or some combination thereof.

In a second background mode, the SMC 128 operates by globally allocating services to acceleration components within the data processing system 102 to meet overall anticipated demand in the data processing system 102 and/or to satisfy other system-wide objectives and other factors (rather than narrowly focusing on individual requests by host components). Here, each triggering event that is received corresponds to some condition in the data processing system 102 as a whole that warrants allocation (or reallocation) of a service, such as a change in demand for the service.

Note, however, that the above-described modes are not mutually exclusive domains of analysis. For example, in the request-driven mode, the SMC 128 may attempt to achieve at least two objectives. As a first primary objective, the SMC 128 will attempt to find an acceleration component (or components) that will satisfy an outstanding request for a service, while also meeting one or more performance goals relevant to the data processing system 102 as a whole. As a second objective, the SMC 128 may optionally also consider the long term implications of its allocation of the service with respect to future uses of that service by other instances of tenant functionality. In other words, the second objective pertains to a background consideration that happens to be triggered by a request by a particular instance of tenant functionality.

For example, consider the following simplified case. An instance of tenant functionality may make a request for a service, where that instance of tenant functionality is associated with a local host component. The SMC 128 may respond to the request by configuring a local acceleration component to perform the service. In making this decision, the SMC 128 may first of all attempt to find an allocation which satisfies the request by the instance of tenant functionality. But the SMC 128 may also make its allocation based on a determination that many other host components have requested the same service, and that these host components are mostly located in the same rack as the instance of tenant functionality which has generated the current request for the service. In other words, this supplemental finding further supports the decision to place the service on an in-rack acceleration component.

FIG. 10 depicts the SMC 128 as optionally including plural logic components that perform different respective analyses. As a first optional component of analysis, the SMC 128 may use status determination logic 1004 to define the status of an allocation that it is making, e.g., as either reserved or non-reserved, dedicated or fully shared, etc. For example, assume that the SMC 128 receives a request from an instance of tenant functionality for a service. In response, the SMC 128 may decide to configure a local acceleration component to provide the service, and, in the process, designate this allocation as non-reserved, e.g., under the initial assumption that the request may be a "one-off" request for the service. In another situation, assume that the SMC 128 makes the additional determination that the same instance of tenant functionality has repeatedly made a request for the same service in a short period of time. In this situation, the SMC 128 may make the same allocation decision as described above, but this time the SMC 128 may designate it as being reserved. The SMC 128 may also optionally designate the service as being dedicated to just the requesting tenant functionality. By doing so, the SMC 128 may enable the data processing system 102 to more effectively satisfy future requests for this service by the instance of tenant functionality. In other words, the reserved status may reduce the chance that the SMC 128 will later move the service from the local acceleration component, where it is being heavily used by the local host component.

In addition, an instance of tenant functionality (or a local host component) may specifically request that it be granted a reserved and dedicated use of a local acceleration component. The status determination logic 1004 can use different environment-specific rules in determining whether to honor this request. For instance, the status determination logic 1004 may decide to honor the request, providing that no other triggering event is received which warrants overriding the request. The status determination logic 1004 may override the request, for instance, when it seeks to fulfill another request that is determined, based on any environment-specific reasons, as having greater urgency than the tenant functionality's request.

In some implementations, note that an instance of tenant functionality (or a local host component or some other consumer of a service) may independently control the use of its local resources. For example, a local host component may pass utilization information to the management functionality 122 which indicates that its local acceleration component is not available or not fully available, irrespective of whether the local acceleration component is actually busy at the moment. In doing so, the local host component may prevent the SMC 128 from "stealing" its local resources. Different implementations can use different environment-specific rules to determine whether an entity is permitted to restrict access to its local resources in the above-described manner, and if so, in what circumstances.

In another example, assume that the SMC 128 determines that there has been a general increase in demand for a particular service. In response, the SMC 128 may find a prescribed number of free acceleration components, corresponding to a "pool" of acceleration components, and then designate that pool of acceleration components as reserved (but fully shared) resources for use in providing the particular service. Later, the SMC 128 may detect a general decrease in demand for the particular service. In response, the SMC 128 can decrease the pool of reserved acceleration components, e.g., by changing the status of one or more acceleration components that were previously registered as "reserved" to "non-reserved."

Note that the particular dimensions of status described above (reserved vs. non-reserved, dedicated vs. fully shared) are cited by way of illustration, not limitation. Other implementations can adopt any other status-related dimensions, or may accommodate only a single status designation (and therefore omit use of the status determination logic 1004 functionality).

As a second component of analysis, the SMC 128 may use size determination logic 1006 to determine a number of acceleration components that are appropriate to provide a service. The SMC 128 can make such a determination based on a consideration of the processing demands associated with the service, together with the resources that are available to meet those processing demands.

As a third component of analysis, the SMC 128 can use type determination logic 1008 to determine the type(s) of acceleration components that are appropriate to provide a service. For example, consider the case in which the data processing system 102 has a heterogeneous collection of acceleration components having different respective capabilities. The type determination logic 1008 can determine one or more of a particular kind of acceleration components that are appropriate to provide the service.

As a fourth component of analysis, the SMC 128 can use placement determination logic 1010 to determine the specific acceleration component (or components) that are appropriate to address a particular triggering event. This determination, in turn, can have one more aspects. For instance, as part of its analysis, the placement determination logic 1010 can determine whether it is appropriate to configure an acceleration component to perform a service, where that component is not currently configured to perform the service.

The above facets of analysis are cited by way of illustration, not limitation. In other implementations, the SMC 128 can provide additional phases of analyses.

Generally, the SMC 128 performs its various allocation determinations based on one or more mapping considerations. For example, one mapping consideration may pertain to historical demand information provided in a data store 1012.

Note, however, that the SMC 128 need not perform multi-factor analysis in all cases. In some cases, for instance, a host component may make a request for a service that is associated with a single fixed location, e.g., corresponding to the local acceleration component or a remote acceleration component. In those cases, the SMC 128 may simply defer to the location determination component 124 to map the service request to the address of the service, rather than assessing the costs and benefits of executing the service in different ways. In other cases, the data store 126 may associate plural addresses with a single service, each address associated with an acceleration component that can perform the service. The SMC 128 can use any mapping consideration(s) in allocating a request for a service to a particular address, such as a load balancing consideration.

As a result of its operation, the SMC 128 can update the data store 126 with information that maps services to addresses at which those services can be found (assuming that this information has been changed by the SMC 128). The SMC 128 can also store status information that pertains to new service-to-component allocations.

To configure one or more acceleration components to perform a function (if not already so configured), the SMC 128 can invoke a configuration component 1014. In one implementation, the configuration component 1014 configures acceleration components by sending a configuration stream to the acceleration components. A configuration stream specifies the logic to be "programmed" into a recipient acceleration component. The configuration component 1014 may use different strategies to configure an acceleration component, several of which are set forth below.

A failure monitoring component 1016 determines whether an acceleration component has failed. The SMC 128 may respond to a failure notification by substituting a spare acceleration component for a failed acceleration component.

B.1. Operation of the SMC in a Request-Driven Mode

Figure 11:
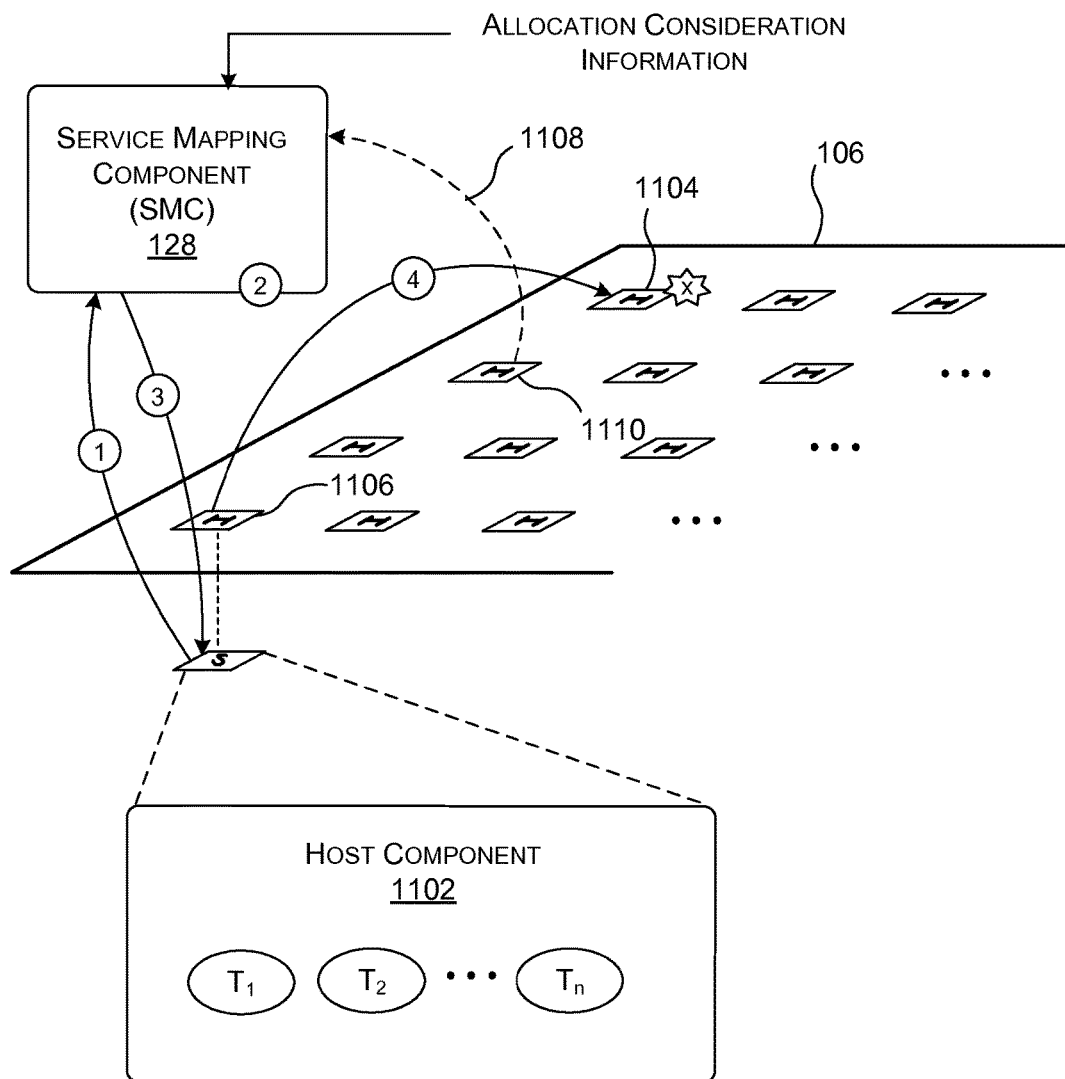
FIG. 11 provides an overview of one request-driven manner of operation of a service mapping component (SMC), which is a component of the management functionality of FIG. 10.
Figure 12:
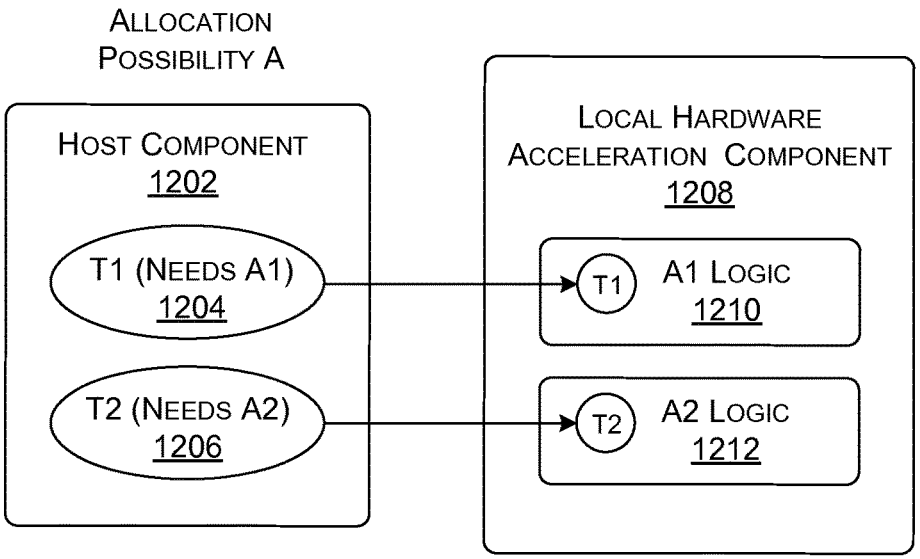
FIGS. 12-15 show different respective options for handling requests for services made by instances of tenant functionality that reside on a host component.

FIG. 11 provides an overview of one manner of operation of the SMC 128 when applied to the task of processing requests by instances of tenant functionality running on host components. In the illustrated scenario, assume that a host component 1102 implements plural instances of tenant functionality ($T_1, T_2, \ldots, T_n$). Each instance of tenant functionality may correspond to a software program that executes, at least in part, on the host component 1102, e.g., in a virtual machine that runs using the physical resources of the host component 1102 (among other possible host components). Further assume that one instance of tenant functionality initiates the transaction shown in FIG. 11 by generating a request for a particular service. For example, the tenant functionality may perform a photo editing function, and may call on a compression service as part of its overall operation. Or the tenant functionality may perform a search algorithm, and may call on a ranking service as part of its overall operation.

In operation (1), the local host component 1102 may send its request for the service to the SMC 128. In operation (2), among other analyses, the SMC 128 may determine at least one appropriate component to implement the service. In this case, assume that the SMC 128 determines that a remote acceleration component 1104 is the most appropriate component to implement the service. The SMC 128 can obtain the address of that acceleration component 1104 from the location determination component 124. In operation (3), the SMC 128 may communicate its answer to the local host component 1102, e.g., in the form of the address associated with the service. In operation (4), the local host component 1102 may invoke the remote acceleration component 1104 via its local acceleration component 1106. Other ways of handling a request by tenant functionality are possible. For example, the local acceleration component 1106 can query the SMC 128, rather than, or in addition to, the local host component 102.

Path 1108 represents an example in which a representative acceleration component 1110 (and/or its associated local host component) communicates utilization information to the SMC 128. The utilization information may identify whether the acceleration component 1110 is available or unavailable for use, in whole or in part. The utilization information may also optionally specify the type of processing resources that the acceleration component 1110 possesses which are available for use. As noted above, the utilization information can also be chosen to purposively prevent the SMC 128 from later utilizing the resources of the acceleration component 1110, e.g., by indicating in whole or in part that the resources are not available.

Although not shown, any acceleration component can also make directed requests for specific resources to the SMC 128. For example, the host component 1102 may specifically ask to use its local acceleration component 1106 as a reserved and dedicated resource. As noted above, the SMC 128 can use different environment-specific rules in determining whether to honor such a request.

Further, although not shown, other components besides the host components can make requests. For example, a hardware acceleration component may run an instance of tenant functionality that issues a request for a service that can be satisfied by itself, another hardware acceleration component (or components), a host component (or components), etc., or any combination thereof.

FIGS. 12-15 show different respective options for handling a request for a service made by tenant functionality that is resident on a host component. Starting with FIG. 12, assume that a local host component 1202 includes at least two instances of tenant functionality, T1 (1204) and T2 (1206), both of which are running at the same time (but, in actuality, the local host component 1202 can host many more instances of tenant functionality). The first instance of tenant functionality T1 requires an acceleration service A1 to perform its operation, while the second instance of tenant functionality T2 requires an acceleration service A2 to perform its operation.

Further assume that a local acceleration component 1208 is coupled to the local host component 1202, e.g., via a PCIe local link or the like. At the current time, the local acceleration component 1208 hosts A1 logic 1210 for performing the acceleration service A1, and A2 logic 1212 for performing the acceleration service A2.

According to one management decision, the SMC 128 assigns T1 to the A1 logic 1210, and assigns T2 to the A2 logic 1212. However, this decision by the SMC 128 is not a fixed rule; as will be described, the SMC 128 may make its decision based on plural factors, some of which may reflect conflicting considerations. As such, based on other factors (not described at this juncture), the SMC 128 may choose to assign jobs to acceleration logic in a different manner from that illustrated in FIG. 12.

Figure 13:
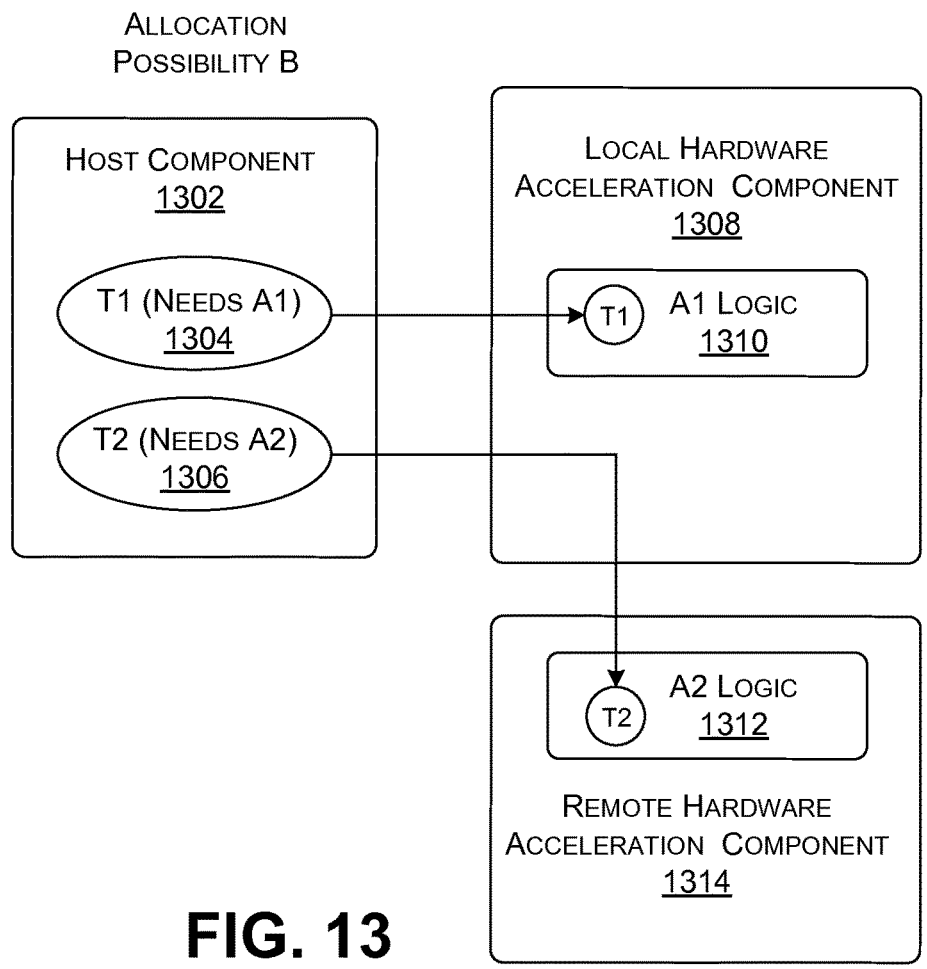

In the scenario of FIG. 13, the host component 1302 has the same instances of tenant functionality (1304, 1306) with the same service needs described above. But in this case, a local acceleration component 1308 includes only A1 logic 1310 for performing service A1. That is, it no longer hosts A2 logic for performing the service A2.

In response to the above scenario, the SMC 128 may choose to assign T1 to the A1 logic 1310 of the acceleration component 1308. The SMC 128 may then assign T2 to the A2 logic 1312 of a remote acceleration component 1314, which is already configured to perform that service. Again, the illustrated assignment is set forth here in the spirit of illustration, not limitation; the SMC 128 may choose a different allocation based on another combination of input considerations. In one implementation, the local host component 1302 and the remote acceleration component 1314 can optionally compress the information that they send to each other, e.g., to reduce consumption of bandwidth.

Note that the host component 1302 accesses the A2 logic 1312 via the local acceleration component 1308. But in another case (not illustrated), the host component 1302 may access the A2 logic 1312 via the local host component (not illustrated) that is associated with the acceleration component 1314.

FIG. 14 presents another scenario in which the host component 1402 has the same instances of tenant functionality (1404, 1406) with the same service needs described above. In this case, a local acceleration component 1408 includes A1 logic 1410 for performing service A1, and A3 logic 1412 for performing service A3. Further assume that the availability information in the data store 1002 indicates that the A3 logic 1412 is not currently being used by any instance of tenant functionality. In response to the above scenario, the SMC 128 may use the configuration component 1014 (of FIG. 10) to reconfigure the acceleration component 1408 so that it includes A2 logic 1414, rather than A3 logic 1412 (as shown at the bottom of FIG. 14). The SMC 128 may then assign T2 to the A2 logic 1414. Although not shown, the SMC 128 can alternatively, or in addition, decide to reconfigure any remote acceleration component to perform the A2 service.

Generally, the SMC 128 can perform configuration in a full or partial manner to satisfy any request by an instance of tenant functionality. The SMC performs full configuration by reconfiguring all of the application logic provided by an acceleration component. The SMC 128 can perform partial configuration by reconfiguring part (e.g., one or more tiles) of the application logic provided by an acceleration component, leaving other parts (e.g., one or more other tiles) intact and operational during reconfiguration. The same is true with respect to the operation of the SMC 128 in its background mode of operation, described below. Further note that additional factors may play a role in determining whether the A3 logic 1412 is a valid candidate for reconfiguration, such as whether or not the service is considered reserved, whether or not there are pending requests for this service, etc.

Figure 15:
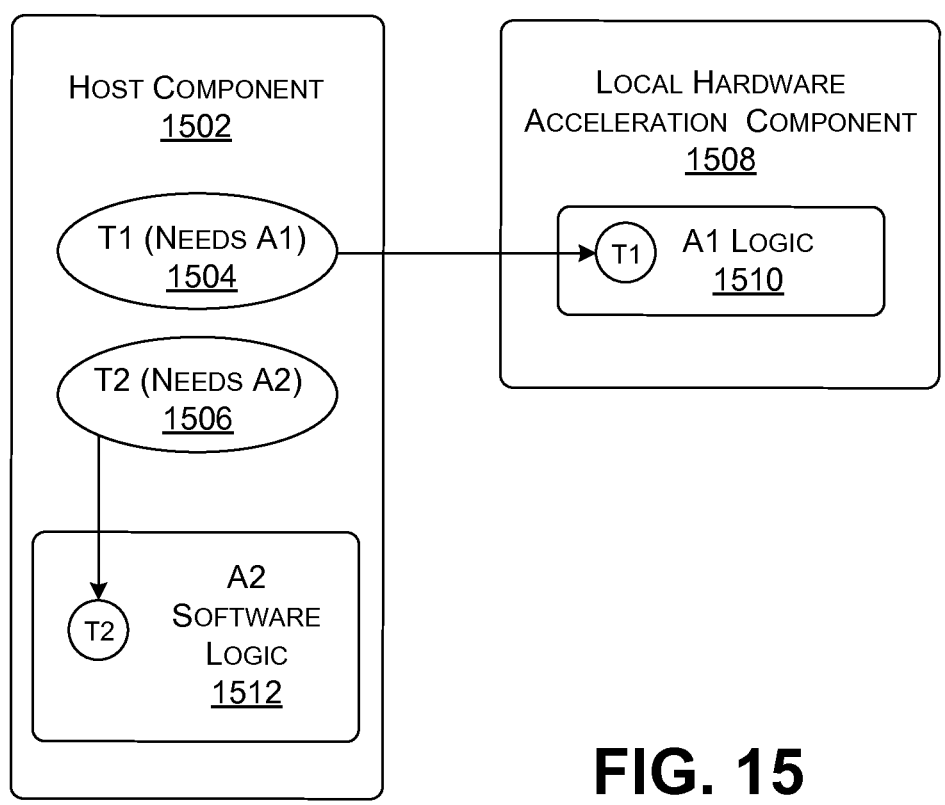

FIG. 15 presents another scenario in which the host component 1502 has the same instances of tenant functionality (1504, 1506) with the same service needs described above. In this case, a local acceleration component 1508 includes only A1 logic 1510) for performing service A1. In response to the above scenario, the SMC 128 may assign T1 to the A1 logic 1510. Further, assume that the SMC 128 determines that it is not feasible for any acceleration component to perform the A2 service. In response, the SMC 128 may instruct the local host component 1502 to assign T2 to local A2 software logic 1512, if, in fact, that logic is available at the host component 1502. The SMC 128 can make the decision of FIG. 15 on various grounds. For example, the SMC 128 may conclude that hardware acceleration is not possible because a configuration image does not currently exist for this service. Or the configuration image may exist, but the SMC 128 concludes that there is insufficient capacity on any of the acceleration devices to load and/or run such a configuration.

Finally, the above examples were described in the context of instances of tenant functionality that run on host components. But as already noted above, the instances of tenant functionality may more generally correspond to service requestors, and those service requestors can run on any component(s), including acceleration components. Thus, for example, a requestor that runs on an acceleration component can generate a request for a service to be executed by one or more other acceleration components and/or by itself and/or by one or more host components. The SMC 102 can handle the requestor's request in any of the ways described above.

B.2. Operation of the SMC in a Background Mode

Figure 16:
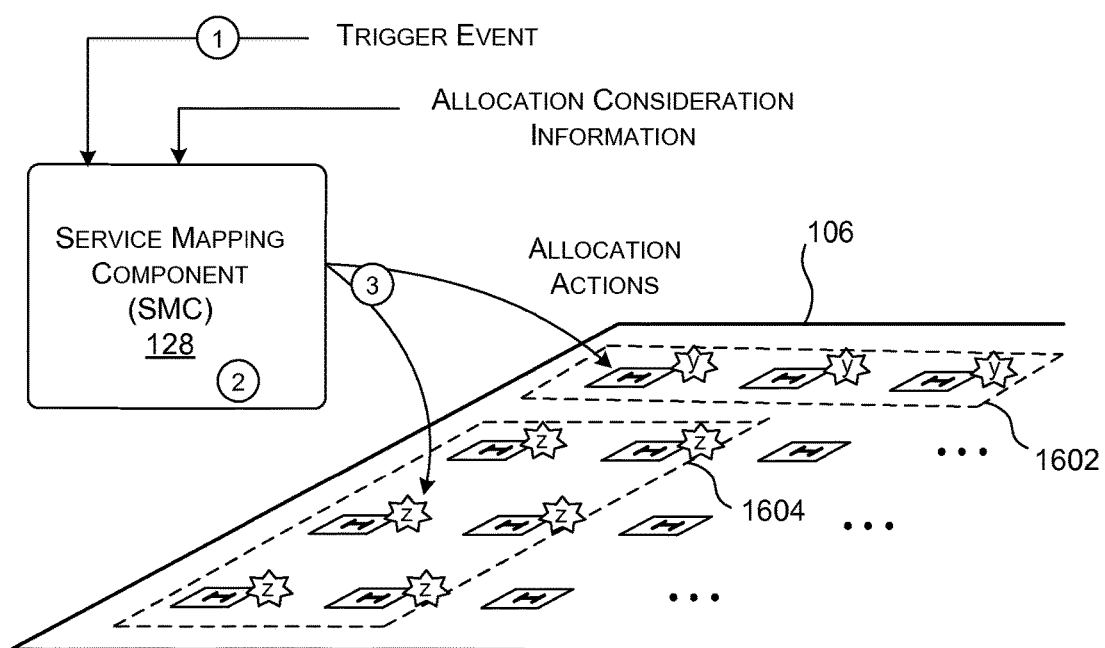
FIG. 16 provides an overview of another, background-related, manner of operation of the SMC of FIG. 10.

FIG. 16 provides an overview of one manner of operation of the SMC 128 when operating in a background mode. In operation (1), the SMC 128 may receive some type of triggering event which initiates the operation of the SMC 128. For example, the triggering event may correspond to a change in demand which affects a service, etc. In operation (2), in response to the triggering event, the SMC 128 determines an allocation of one or more services to acceleration components based one or more mapping considerations and the availability information in the data store 1002, e.g., by assigning the services to a set of one or more available acceleration components. In operation (3), the SMC 128 carries out its allocation decisions. As part of this process, the SMC 128 may call on the configuration component 1014 to configure the acceleration components that have been allocated to perform the service(s), assuming that these components are not already configured to perform the service(s). The SMC 128 also updates the service location information in the data store 126, and, if appropriate, the availability information in the data store 1002.

In the particular example of FIG. 16, the SMC 102 allocates a first group 1602 of acceleration components to perform a first service ("service y"), and allocates a second group 1604 of acceleration components to perform a second service ("service z"). In actual practice, an allocated group of acceleration components can have any number of members, and these members may be distributed in any fashion across the hardware acceleration plane 106. The SMC 128, however, may attempt to group the acceleration components associated with a service in a particular manner to achieve satisfactory bandwidth and latency performance (among other factors). The SMC 128 may apply further analysis in allocating acceleration components associated with a single multi-component service.

The SMC 128 can also operate in the background mode to allocate one or more acceleration components, which implement a particular service, to at least one instance of tenant functionality, without necessarily requiring the tenant functionality to make a request for this particular service each time. For example, assume that an instance of tenant functionality regularly uses a compression function, corresponding to "service z" in FIG. 16. The SMC 128 can proactively allocate one or more dedicated acceleration components 1604 to at least this instance of tenant functionality. When the tenant functionality requires use of the service, it may draw from the pool of available addresses associated with the acceleration components 1604 that have been assigned to it. The same dedicated mapping operation can be performed with respect to a group of instances of tenant functionality (instead of a single instance).

B.3. Physical Implementations of the Management Functionality

Figure 17:
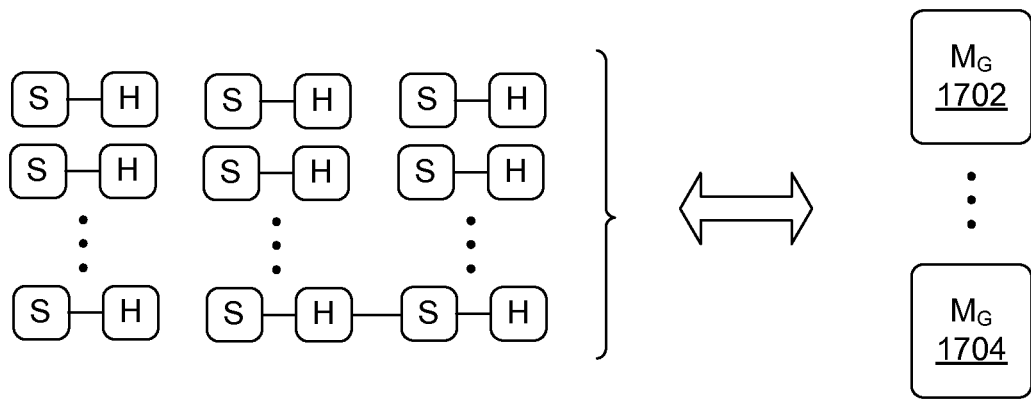
FIGS. 17-20 show different respective architectures for physically implementing the management functionality of FIG. 10.

FIG. 17 shows a first physical implementation of the management functionality 122 of FIG. 10. In this case, the management functionality 122 is provided on a single global management component ($M_G$) 1702, or on plural global management components (1702, . . . , 1704). The plural global management components (1702, . . . , 1704), if used, may provide redundant logic and information to achieve desired load balancing and failure management performance. In one case, each global management component may be implemented on a computer server device, which may correspond to one of the host components, or a dedicated management computing device. In operation, any individual host component (S) or acceleration component (H) may interact with a global management component via the common network 120 shown in FIG. 1.

Figure 18:
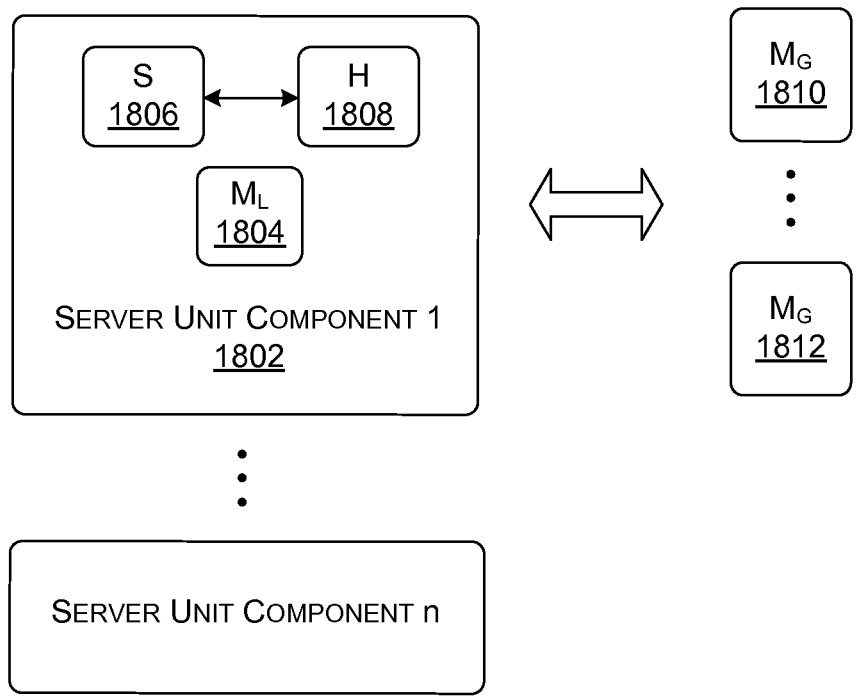

FIG. 18 shows a second physical implementation of the management functionality 122 of FIG. 10. In this case, each server unit component (such as representative server unit component 1802) provides at least one local management component ($M_L$) 1804. For example, a local host component 1806 may implement the local management component 1804 (e.g., as part of its hypervisor functionality), or a local acceleration component 1808 may implement the local management component 1804, or some other component within the server unit component 1802 may implement the local management component 1804 (or some combination thereof). The data processing system 102 also includes one or more global management components (1810, . . . , 1812). Each global management component may provide redundant logic and information in the manner described above with respect to FIG. 17. The management functionality 122 collectively presents all of the local and global management components in the data processing system 102, as set forth above.

The architecture of FIG. 18 can implement the request-driven aspects of the SMC 128, for instance, in the following manner. The local management component 1804 may first determine whether the local acceleration component 1808 can perform a service requested by tenant functionality. A global management component ($M_G$) can perform other decisions, such as identifying a remote acceleration component to perform a service, in the event that the local acceleration component 1808 cannot perform this task. On the other hand, in the architecture of FIG. 17, a single global management component can perform all decisions pertaining to the mapping of a request to an acceleration component.

Further, the local management component 1804 can send utilization information to a global management component on any basis, such as periodic basis and/or an event-driven basis (e.g., in response to a change in utilization). The global management component can use the utilization information to update its master record of availability information in the data store 1002.

Figure 19:
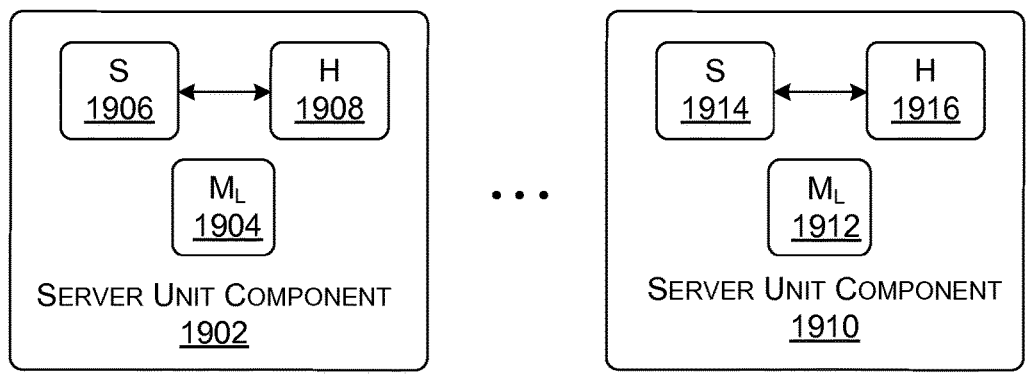

FIG. 19 shows a third physical implementation of the management functionality 122 of FIG. 10. In this case, each server unit component stores its own dedicated local management component ($M_L$) (which can be implemented by a local host component as part of its hypervisor functionality, a local acceleration component, some other local component, or some combination thereof). For instance, a server unit component 1902 provides a local management component 1904, along with a local host component 1906 and a local acceleration component 1908. Likewise, a server unit component 1910 provides a local management component 1912, along with a local host component 1914 and a local acceleration component 1916. Each instance of a local management component stores redundant logic and information with respect to other instances of the same component. Known distributed system tools can be used to ensure that all distributed versions of this component contain the same logic and information, such as the ZOOKEEPER tool provided by Apache Software Foundation of Forest Hill, Md. (As an aside, note that the same technology can be used to maintain the redundant logic and information in the other examples described in this subsection.) The management functionality 122 collectively presents all of the local management components in the data processing system 102, as set forth above. That is, there is no central global management component(s) in this implementation.

Figure 20:
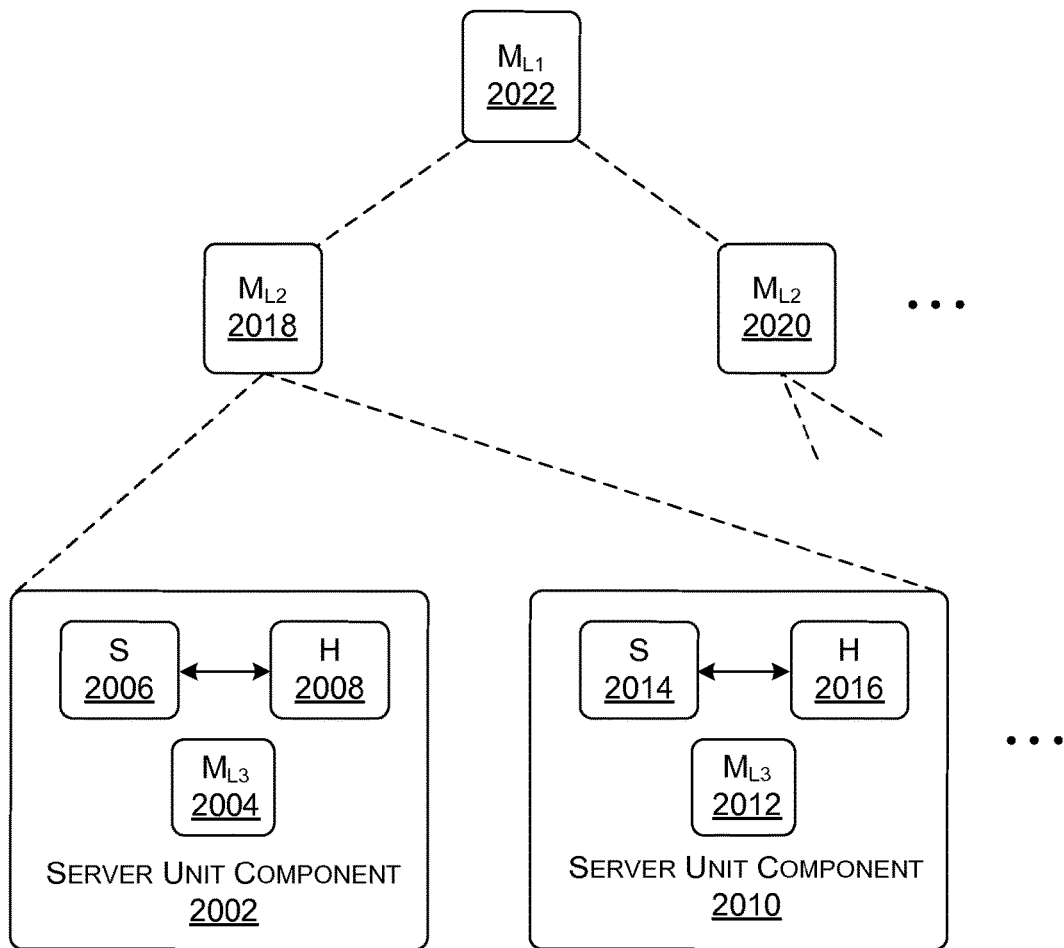
Figure 21:
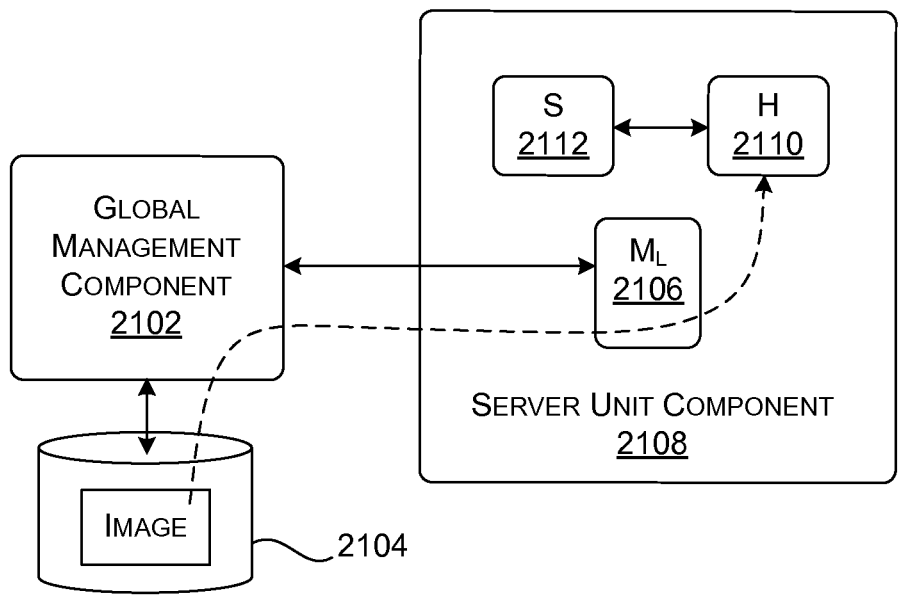
FIGS. 21-24 show different respective strategies for configuring a hardware acceleration component in the data processing system of FIG. 1.

FIG. 20 shows a fourth physical implementation of the management functionality 122 of FIG. 10. In this case, the management functionality 122 embodies a hierarchical structure of individual management components. For example, in one merely representative structure, each server unit component includes a low-level local management component ($M_{L3}$) (which can be implemented by a local host component, a local acceleration component, some other local component, or some combination thereof). For example, a server unit component 2002 provides a low-level local management component 2004, along with a local host component 2006 and a local acceleration component 2008. Likewise, a server unit component 2010 provides a low-level local management component 2012, along with a local host component 2014 and an acceleration component 2016. A next management tier of the structure includes at least a mid-level management component 2018 and a mid-level management component 2020. A top level of the structure includes a single global management component 2022 (or plural redundant such global management components). The illustrated control architecture thus forms a structure having three levels, but the architecture can have any number of levels.

In operation, the low-level management components (2004, 2012, . . . ) handle certain low-level management decisions that directly affect the resources associated with individual server unit components. The mid-level management components (2018, 2020) can make decisions which affect a relevant section of the data processing system 102, such as an individual rack or a group of racks. The top-level management component (2022) can make global decisions which broadly apply to the entire data processing system 102.

B.4. The Configuration Component

FIGS. 21-24 show different respective strategies for configuring an acceleration component, corresponding to different ways of implementing the configuration component 1014 of FIG. 10. Starting with FIG. 21, a global management component 2102 has access to a data store 2104 that provides one or more configuration images. Each configuration image contains logic that can be used to implement a corresponding service. The global management component 2102 can configure an acceleration component by forwarding a configuration stream (corresponding to a configuration image) to the acceleration component. For example, in one approach, the global management component 2102 can send the configuration stream to a local management component 2106 associated with a particular server unit component 2108. The local management component 2106 can then coordinate the configuration of a local acceleration component 2110 based on the received configuration stream. Alternatively, the local host component 2112 can perform the above-described operation, instead of, or in addition to, the local management component 2106.

Figure 22:
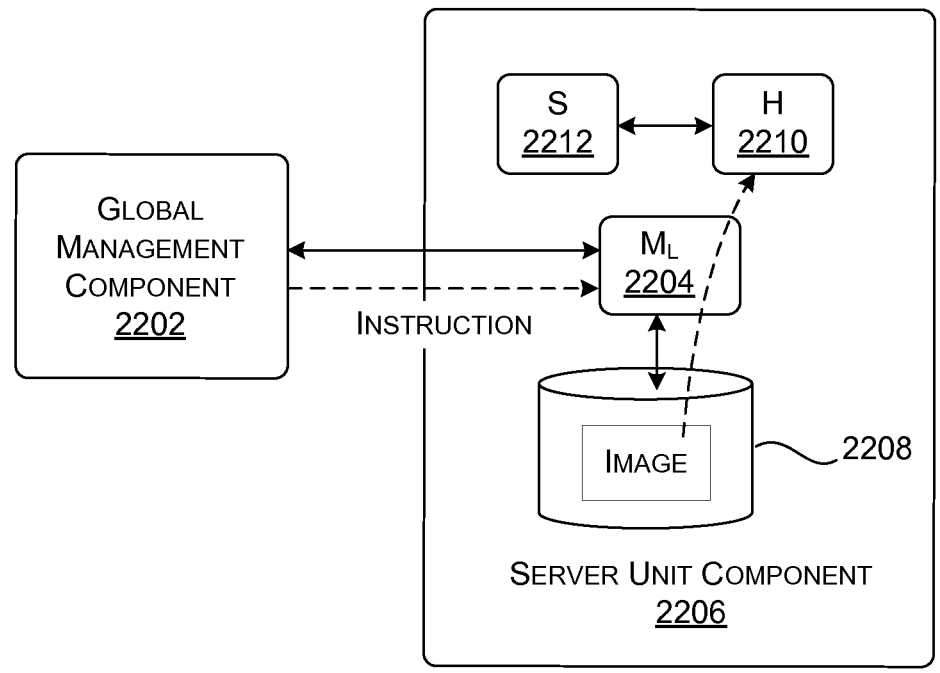

FIG. 22 shows another strategy for configuring an acceleration component. In this case, a global management component 2202 sends an instruction to a local management component 2204 of a server unit component 2206. In response, the local management component 2204 accesses a configuration image in a local data store 2208 and then uses it to configure a local acceleration component 2210. Alternatively, a local host component 2212 can perform the above-described operation, instead of, or in addition to, the local management component 2204.

Figure 23:
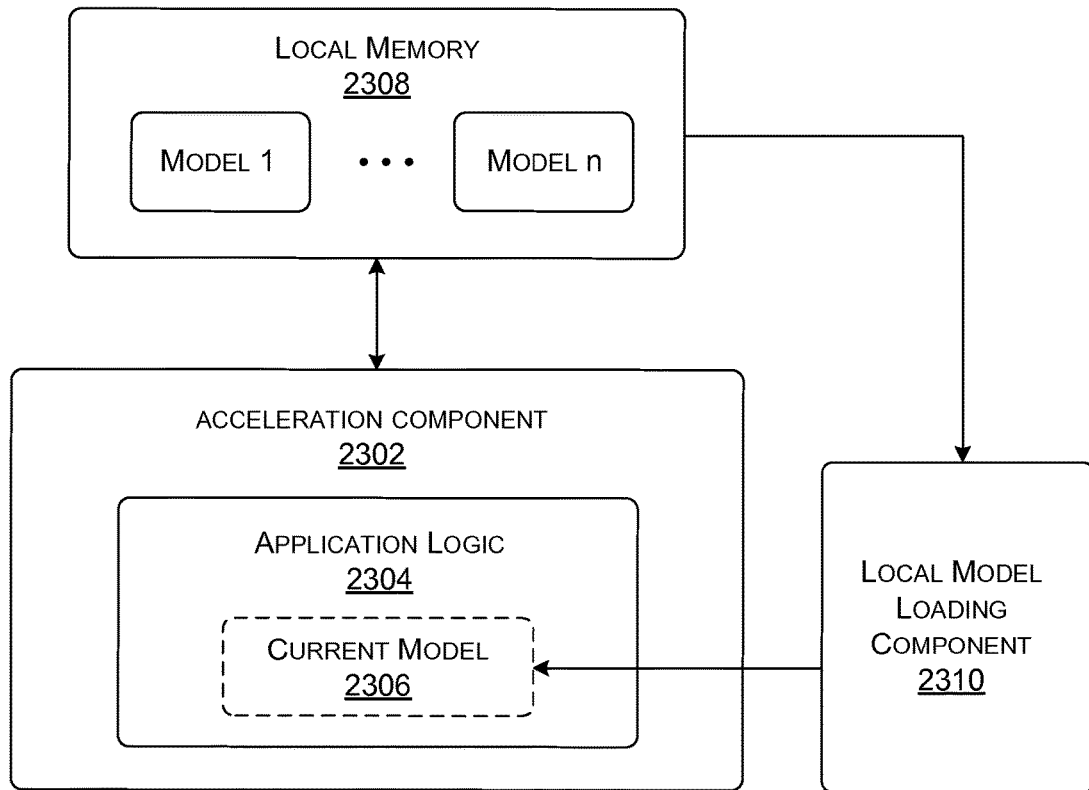

FIG. 23 shows another technique for configuring a local acceleration component 2302. In this approach, assume that the acceleration component 2302 includes application logic 2304, which, in turn, is governed by a current model 2306 (where a model corresponds to logic that performs a function in a particular manner). Further assume that the acceleration component 2302 has access to local memory 2308. The local memory 2308 stores configuration images associated with one or more other models (model 1, . . . , model n). When triggered, a local model loading component 2310 can swap out the configuration associated with the current model 2306 with the configuration associated with another model in the local memory 2308. The model loading component 2310 may be implemented by the acceleration component 2302 itself, a local host component, a local management component, etc., or some combination thereof. In one implementation, the configuration operation shown in FIG. 23 can be performed in less time than the overall reconfiguration of the application logic 2304 as a whole, as it entails replacing some of the logic used by the application logic 2304, not the entire application logic 2304 in wholesale fashion.

Figure 24:
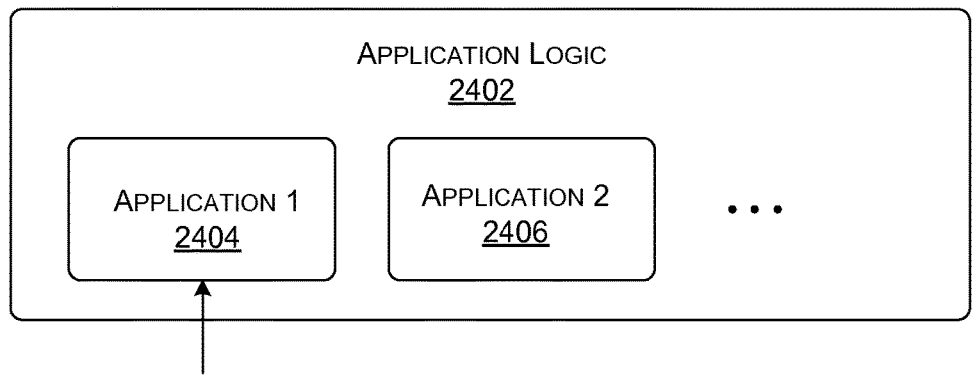

Finally, FIG. 24 shows an acceleration component having application logic 2402 that supports partial configuration. The management functionality 122 can leverage this capability by configuring application 1 (2404) separately from application 2 (2406), and vice versa.

C. Illustrative Implementation of a Hardware Acceleration Component

Figure 25:
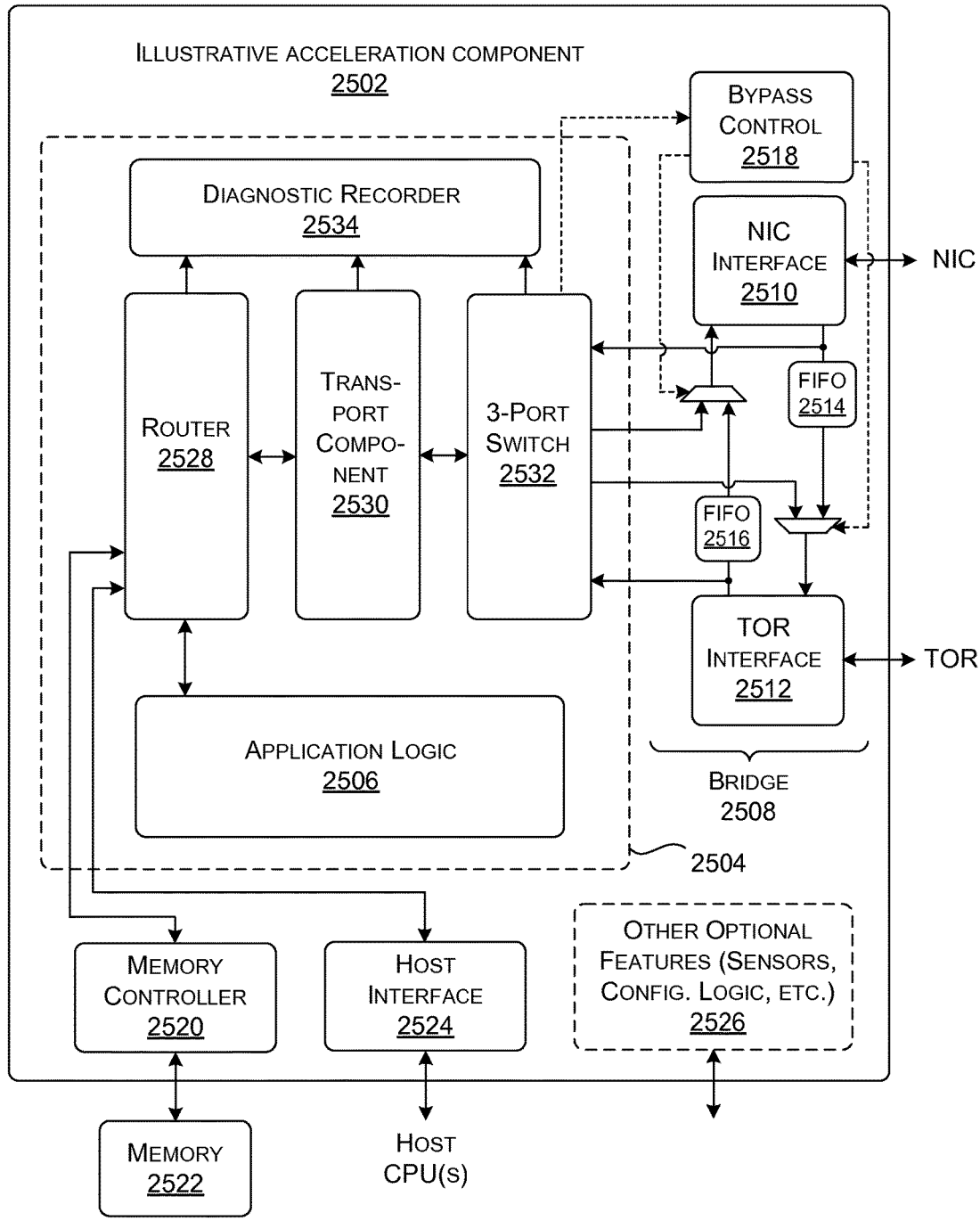
FIG. 25 shows one manner of implementing a hardware acceleration component of FIG. 1.

FIG. 25 shows one manner of implementing an acceleration component 2502 in the data processing system of FIG. 1, which may be physically implemented as an FPGA device. Note that the detail presented below is set forth in the spirit of illustration, not limitation; other data processing systems may use acceleration components having architectures which vary in one or more ways compared to that shown in FIG. 25. Further, other data processing systems may employ a heterogeneous design that includes acceleration components having different types.

From a high-level standpoint, the acceleration component 2502 may be implemented as a hierarchy having different layers of functionality. At a lowest level, the acceleration component 2502 provides an "outer shell" which provides basic interface-related components that generally remain the same across most application scenarios. A core component 2504, which lies inside the outer shell, may include an "inner shell" and application logic 2506. The inner shell corresponds to all the resources in the core component 2504 other than the application logic 2506, and represents a second level of resources that remain the same within a certain set of application scenarios. The application logic 2506 itself represents a highest level of resources which are most readily subject to change. Note however that any component of the acceleration component 2502 can technically be reconfigured.

In operation, the application logic 2506 interacts with the outer shell resources and inner shell resources in a manner analogous to the way a software-implemented application interacts with its underlying operating system resources. From an application development standpoint, the use of common outer shell resources and inner shell resources frees a developer from having to recreate these common components for each application that he or she creates. This strategy also reduces the risk that a developer may alter core inner or outer shell functions in a manner that causes problems within the data processing system 102 as a whole.

Referring first to the outer shell, the acceleration component 2502 includes a bridge 2508 for coupling the acceleration component 2502 to the network interface controller (via a NIC interface 2510) and a local top-of-rack switch (via a TOR interface 2512). The bridge 2508 supports two modes. In a first node, the bridge 2508 provides a data path that allows traffic from the NIC or TOR to flow into the acceleration component 2502, and traffic from the acceleration component 2502 to flow out to the NIC or TOR. The acceleration component 2502 can perform any processing on the traffic that it "intercepts," such as compression, encryption, etc. In a second mode, the bridge 2508 supports a data path that allows traffic to flow between the NIC and the TOR without being further processed by the acceleration component 2502. Internally, the bridge may be composed of various FIFOs (2514, 2516) which buffer received packets, and various selectors and arbitration logic which route packets to their desired destinations. A bypass control component 2518 controls whether the bridge 2508 operates in the first mode or the second mode.

A memory controller 2520 governs interaction between the acceleration component 2502 and local memory 2522 (such as DRAM memory). The memory controller 2520 may perform error correction as part of its services.

A host interface 2524 provides functionality that enables the acceleration component to interact with a local host component (not shown in FIG. 25). In one implementation, the host interface 2524 may use Peripheral Component Interconnect Express (PCIe), in conjunction with direct memory access (DMA), to exchange information with the local host component.

Finally, the shell may include various other features 2526, such as clock signal generators, status LEDs, error correction functionality, and so on.

In one implementation, the inner shell may include a router 2528 for routing messages between various internal components of the acceleration component 2502, and between the acceleration component 2502 and external entities (via a transport component 2530). Each such endpoint is associated with a respective port. For example, the router 2528 is coupled to the memory controller 2520, host interface 1120, application logic 2506, and transport component 2530.

The transport component 2530 formulates packets for transmission to remote entities (such as remote acceleration components), and receives packets from the remote acceleration components (such as remote acceleration components).

A 3-port switch 2532, when activated, takes over the function of the bridge 2508 by routing packets between the NIC and TOR, and between the NIC or TOR and a local port associated with the acceleration component 2502 itself.

Finally, an optional diagnostic recorder 2534 stores transaction information regarding operations performed by the router 2528, transport component 2530, and 3-port switch 2532 in a circular buffer. For example, the transaction information may include data about a packet's origin and destination IP addresses, host-specific data, timestamps, etc. A technician may study a log of the transaction information in an attempt to diagnose causes of failure or sub-optimal performance in the acceleration component 2502.

Figure 26:
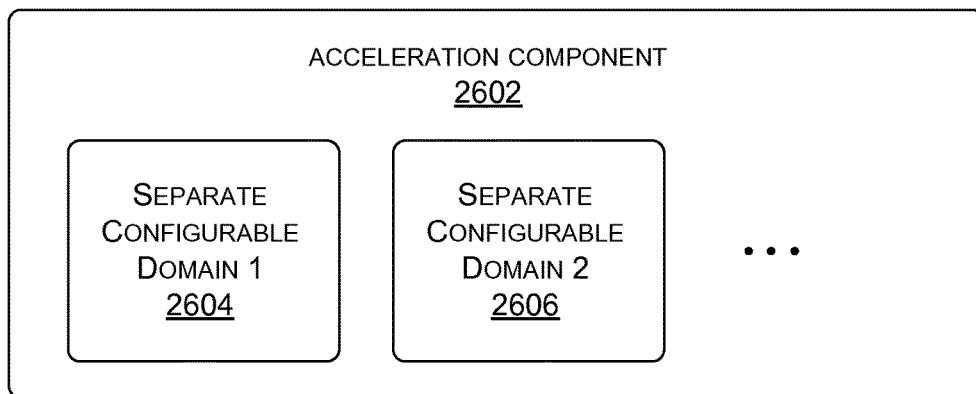
FIG. 26 shows a hardware acceleration component including separate configurable domains.

FIG. 26 shows an acceleration component 3202 that includes separate configurable domains (2604, 2606, . . . ). A configuration component (e.g., configuration component 1014 of FIG. 10) can configure each configurable domain without affecting other configurable domains. Hence, the configuration component 1014 can configure one or more configurable domains while the other configurable domains are executing operations based on their respective configurations, which are not disturbed.

In some implementations, the data processing system 102 of FIG. 1 may dynamically reconfigure its acceleration components to address any mapping considerations. That reconfiguration can be performed on a partial and/or whole-service basis, and may be performed on a periodic and/or event-driven basis. Indeed, in some cases, the data processing system 102 may appear to be continually in the process of adapting itself to changing conditions in the data processing system 102 by reconfiguring its acceleration logic.

C.1. The Local Link

Figure 27:
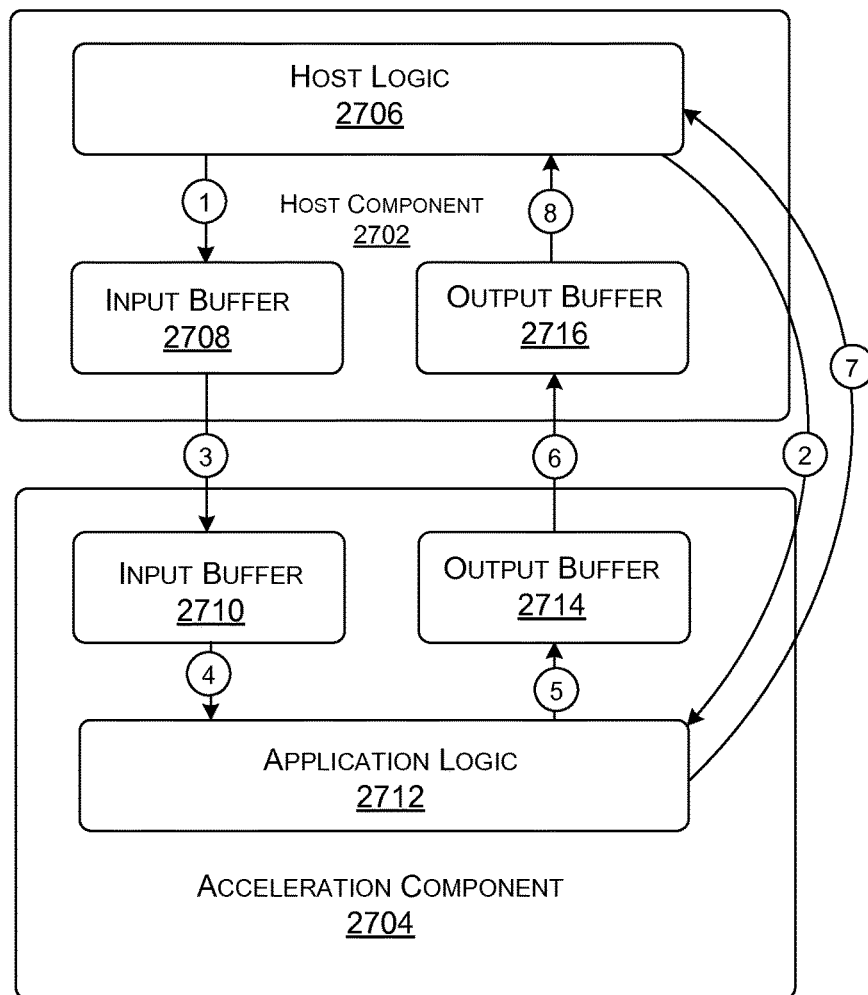
FIG. 27 shows functionality for performing data transfer between a local host component and an associated local hardware acceleration component.

FIG. 27 shows functionality by which a local host component 2702 may forward information to its local acceleration component 2704 via the host interface 2524 shown in FIG. 25 (e.g., using PCIe in conjunction with DMA memory transfer). In one non-limiting protocol, in operation (1), the host logic 2706 places data to be processed into a kernel-pinned input buffer 2708 in main memory associated with the host logic 2706. In operation (2), the host logic 2706 instructs the acceleration component 2704 to retrieve the data and begin processing it. The host logic's thread is then either put to sleep until it receives a notification event from the acceleration component 2704, or it continues processing other data asynchronously. In operation (3), the acceleration component 2704 transfers the data from the host logic's memory and places it in an acceleration component input buffer 2710.

In operations (4) and (5), the application logic 2712 retrieves the data from the input buffer 2710, processes it to generate an output result, and places the output result in an output buffer 2714. In operation (6), the acceleration component 2704 copies the contents of the output buffer 2714 into an output buffer in the host logic's memory. In operation (7), the acceleration component notifies the host logic 2706 that the data is ready for it to retrieve. In operation (8), the host logic thread wakes up and consumes the data in the output buffer 2716. The host logic 2706 may then discard the contents of the output buffer 2716, which allows the acceleration component 2704 to reuse it in the next transaction.

C.2. The Router

Figure 28:
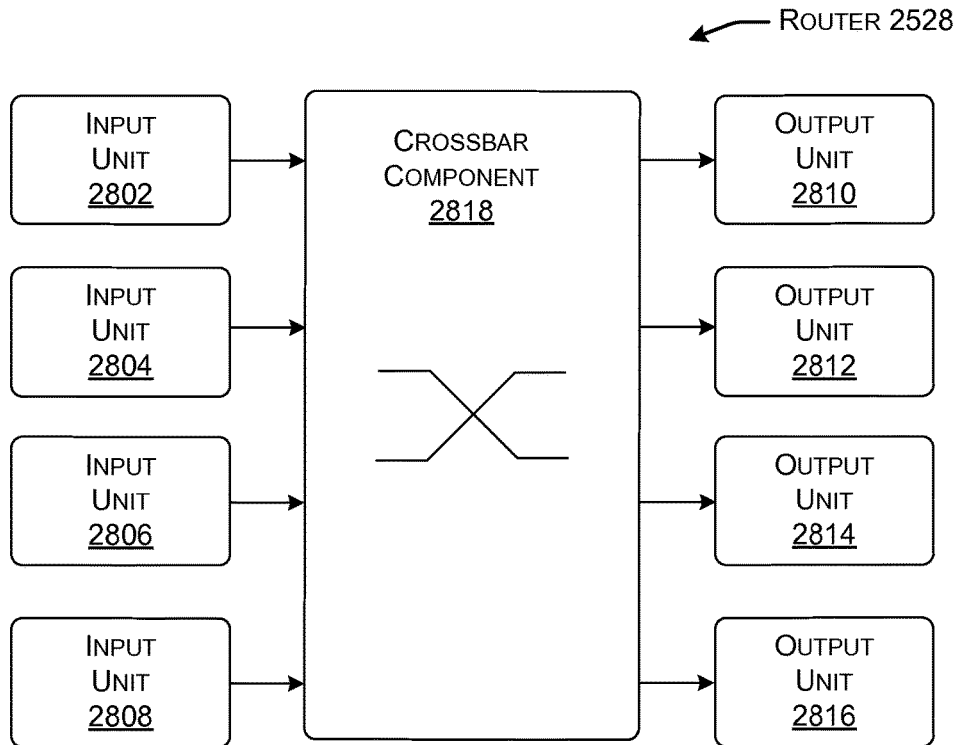
FIG. 28 shows one implementation of a router introduced in FIG. 25.

FIG. 28 shows one implementation of the router 2528 introduced in FIG. 25. The router includes any number of input units (here four, 2802, 2804, 2806, 2808) for receiving messages from respective ports, and output units (here four, 2810, 2812, 2814, 2814) for forwarding messages to respective ports. As described above, the endpoints associated with the ports include the memory controller 2520, the host interface 2524, the application logic 2506, and the transport component 2530. A crossbar component 2818 forwards a message from an input port to an output port based on address information associated with the message. More specifically, a message is composed of multiple "flits," and the router 2528 sends messages on a flit-by-flit basis.

In one non-limiting implementation, the router 2528 supports a number of virtual channels (such as eight) for transmitting different classes of traffic over a same physical link. That is, the router 2528 may support multiple traffic classes for those scenarios in which multiple services are implemented by the application logic 2506, and those services need to communicate on separate classes of traffic.

The router 2528 may govern access to the router's resources (e.g., its available buffer space) using a credit-based flow technique. In that technique, the input units (2802-2808) provide upstream entities with credits, which correspond to the exact number of flits available in their buffers. The credits grant the upstream entities the right to transmit their data to the input units (2802-2808). More specifically, in one implementation, the router 2528 supports "elastic" input buffers that can be shared among multiple virtual channels. The output units (2810-2816) are responsible for tracking available credits in their downstream receivers, and provide grants to any input units (2802-2808) that are requesting to send a flit to a given output port.

C.3. The Transport Component

Figure 29:
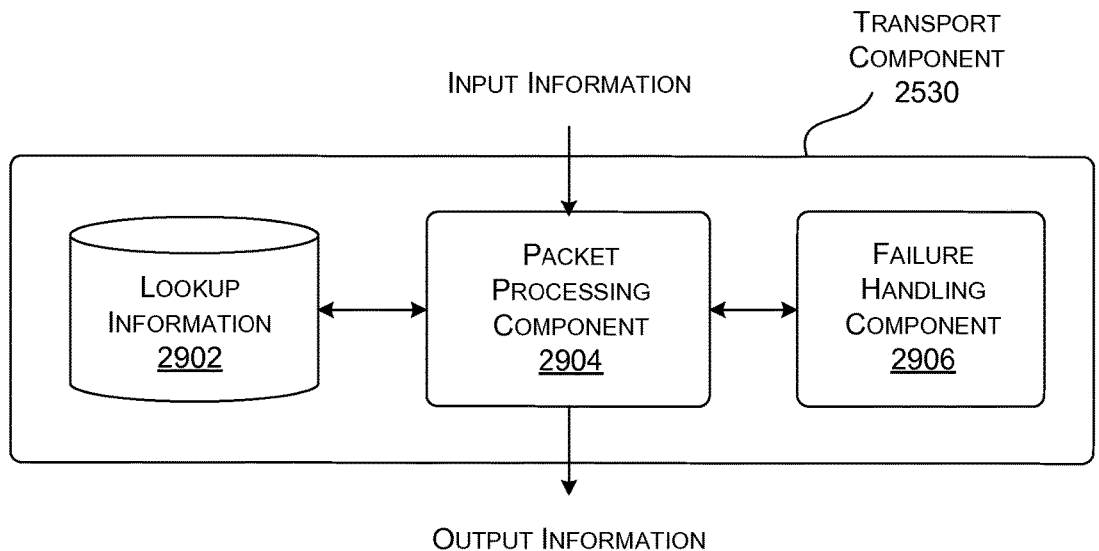
FIG. 29 shows one implementation of a transport component introduced in FIG. 25.

FIG. 29 shows one implementation of the transport component 2530 introduced in FIG. 25. The transport component 2530 may provide a register interface to establish connections between nodes. That is, each such connection is one-way and links a send queue on a source component to a receive queue on a destination component. A software process may set up the connections by statically allocating them before the transport component 2530 can transmit or receive data. A data store 2902 stores two tables that control the state of connections, a Send Connection Table and a Receive Connection Table.

A packet processing component 2904 processes messages arriving from the router 2528 which are destined for a remote endpoint (e.g., another acceleration component). It does so by buffering and packetizing the messages. The packet processing component 2904 also processes packets that are received from some remote endpoint and are destined for the router 2528.

For messages arriving from the router 2528, the packet processing component 2904 matches each message request to a Send Connection Table entry in the Send Connection Table, e.g., using header information and virtual channel (VC) information associated with the message as a lookup item, as provided by router 2528. The packet processing component 2904 uses the information retrieved from the Send Connection Table entry (such as a sequence number, address information, etc.) to construct packets that it sends out to the remote entity.

More specifically, in one non-limiting approach, the packet processing component 2904 encapsulates packets in UDP/IP Ethernet frames, and sends them to a remote acceleration component. In one implementation the packets may include an Ethernet header, followed by an IPv4 header, followed by a UDP header, followed by transport header (specifically associated with the transport component 2530), followed by a payload.

For packets arriving from the network (e.g., as received on a local port of the 3-port switch 2532), the packet processing component 2904 matches each packet to a Receive Connectable Table entry provided in the packet header. If there is a match, the packet processing component retrieves a virtual channel field of the entry, and uses that information to forward the received message to the router 2528 (in accordance with the credit-flow technique used by the router 2528).

A failure handling component 2906 buffers all sent packets until it receives an acknowledgement (ACK) from the receiving node (e.g., the remote acceleration component). If an ACK for a connection does not arrive within a specified time-out period, the failure handling component 2906 can retransmit the packet. The failure handling component 2906 will repeat such retransmission for a prescribed number times (e.g., 128 times). If the packet remains unacknowledged after all such attempts, the failure handling component 2906 can discard it and free its buffer.

C.4. The 3-Port Switch

Figure 30:
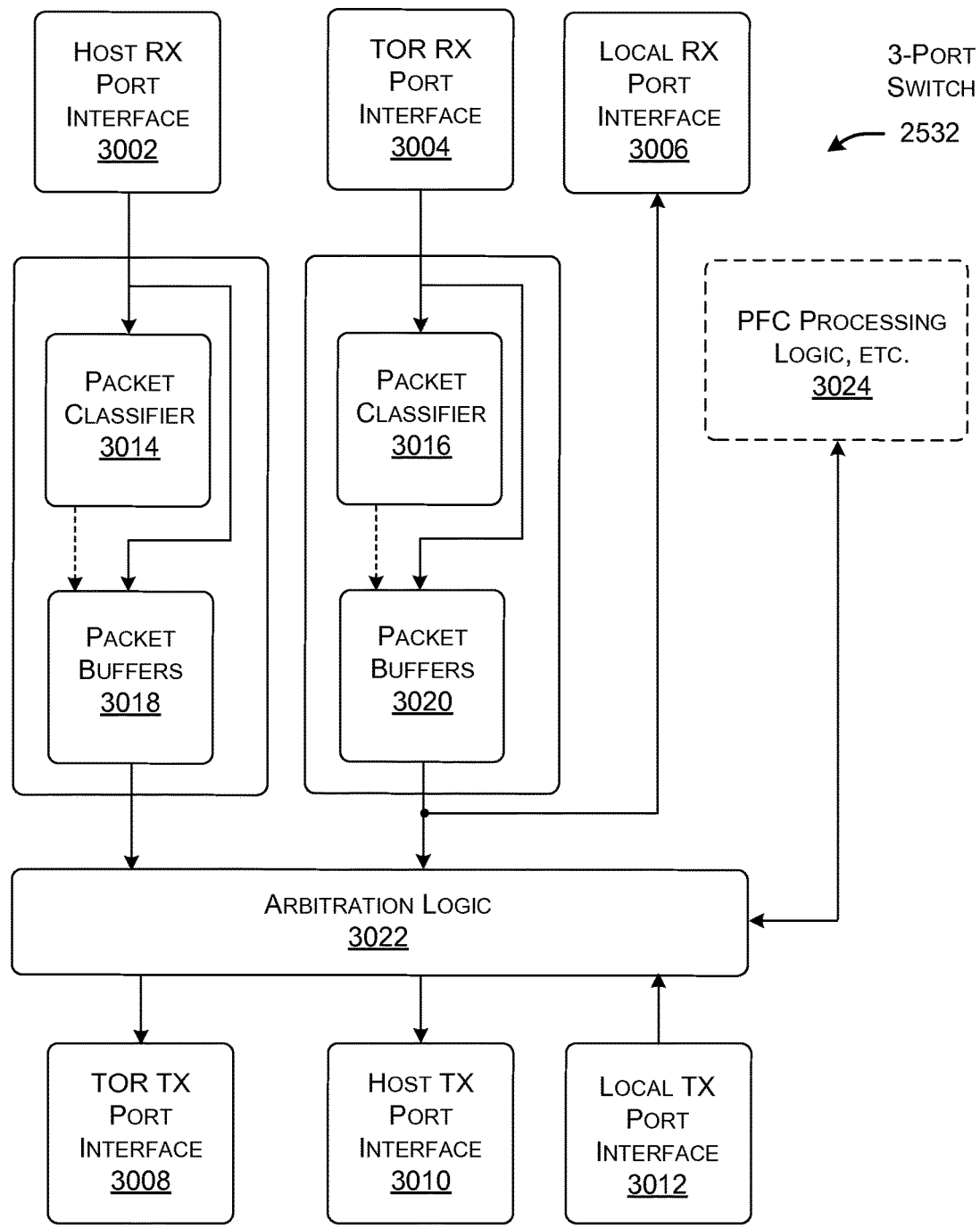
FIG. 30 shows one implementation of a 3-port switch introduced in FIG. 25.

FIG. 30 shows one implementation of the 3-port switch 2532. The 3-port switch 2532 operates to safely insert (and remove) acceleration component-generated network packets onto a data center network without compromising host-to-TOR network traffic.

The 3-port switch 2532 connects to the NIC interface 2510 (corresponding to a host interface), the TOR interface 2512, and a local interface associated with the local acceleration component 2502 itself. The 3-port switch 2532 may be conceptualized as including receiving interfaces (3002, 3004, 3006) for respectively receiving packets from the host component and TOR switch, and for receiving packets at the local acceleration component. The 3-port switch 2532 also includes transmitting interfaces (3008, 3010, 3012) for respectively providing packets to the TOR switch and host component, and receiving packets transmitted by the local acceleration component.

Packet classifiers (3014, 3016) determine the class of packets received from the host component or the TOR switch, e.g., based on status information specified by the packets. In one implementation, each packet is either classified as belonging to a lossless flow (e.g., remote direct memory access (RDMA) traffic) or a lossy flow (e.g., transmission control protocol/Internet Protocol (TCP/IP) traffic). Traffic that belongs to a lossless flow is intolerant to packet loss, while traffic that belongs to a lossy flow can tolerate some packet loss.

Packet buffers (3018, 3020) store the incoming packets in different respective buffers, depending on the class of traffic to which they pertain. If there is no space available in the buffer, the packet will be dropped. (In one implementation, the 3-port switch 2532 does not provide packet buffering for packets provided by the local acceleration component (via the local port) because the application logic 2506 can regulate the flow of packets through the use of "back pressuring.") Arbitration logic 3022 selects among the available packets and transmits the selected packets.

As described above, traffic that is destined for the local acceleration component is encapsulated in UDP/IP packets on a fixed port number. The 3-port switch 2532 inspects incoming packets (e.g., as received from the TOR) to determine if they are UDP packets on the correct port number. If so, the 3-port switch 2532 outputs the packet on the local RX port interface 3006. In one implementation, all traffic arriving on the local TX port interface 3012 is sent out of the TOR TX port interface 3008, but it could also be sent to the host TX port interface 3010. Further note that FIG. 30 indicates that the acceleration component 2502 intercepts traffic from the TOR, but not from the host component; but it could be configured to intercept traffic from the host component as well.

PFC processing logic 3024 allows the 3-port switch 2532 to insert Priority Flow Control frames into either the flow of traffic transmitted to the TOR or host component. That is, for lossless traffic classes, if a packet buffer fills up, the PFC processing logic 3024 sends a PFC message to the link partner, requesting that traffic on that class be paused. If a PFC control frame is received for a lossless traffic class on either the host RX port interface 3002 or the TOR RX port interface 3004, the 3-port switch 2532 will cease sending packets on the port that received the control message.

C.5. An Illustrative Host Component

Figure 31:
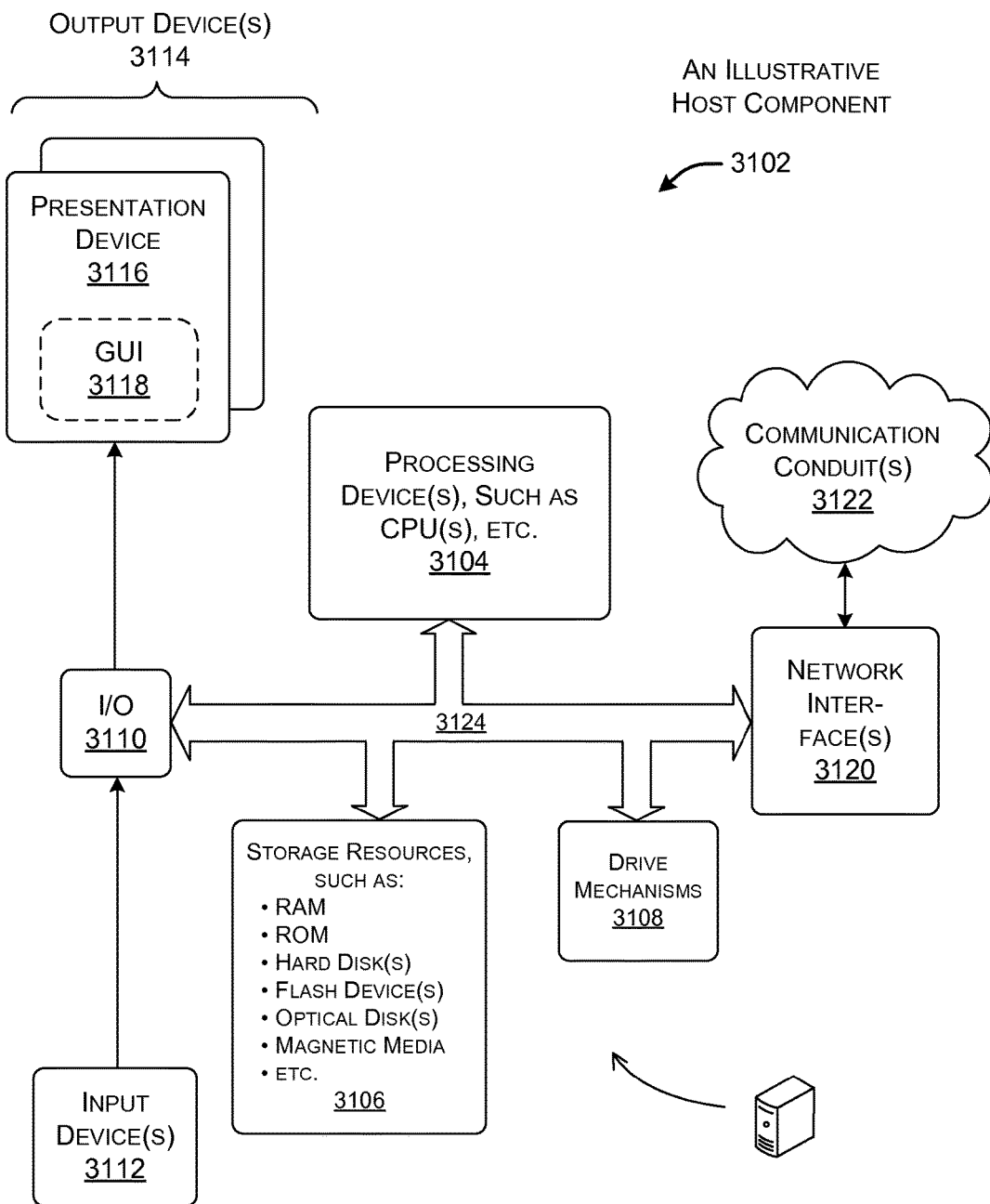
FIG. 31 shows one implementation of a host component shown in FIG. 1.

FIG. 31 shows one implementation of a host component 3102, corresponding to any of the host components (S) shown in FIG. 1. The host component 3102 can include one or more processing devices 3104, such as one or more central processing units (CPUs), each of which may implement one or more hardware threads. The host component 3102 can also include any storage resources 3106 for storing any kind of information, such as code, settings, data, etc. Without limitation, for instance, the storage resources 3106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the host component 3102. In one case, the host component 3102 may perform any of the operations associated with local tenant functionality when the processing devices 3104 carry out associated instructions stored in any storage resource or combination of storage resources. The host component 3102 also includes one or more drive mechanisms 3108 for interacting with any storage resource, such as a hard disk drive mechanism, an optical disk drive mechanism, and so on.

The host component 3102 also includes an input/output module 3110 for receiving various inputs (via input devices 3112), and for providing various outputs (via output devices 3114). One particular output mechanism may include a presentation device 3116 and an associated graphical user interface (GUI) 3118. The host component 3102 can also include one or more network interfaces 3120 for exchanging data with other devices via one or more communication conduits 3122. One or more communication buses 3124 communicatively couple the above-described components together.

The communication conduit(s) 3122 can be implemented in any manner, e.g., by a local area network, a wide area network (e.g., the Internet), point-to-point connections, etc., or any combination thereof. The communication conduit(s) 3722 can include any combination of hardwired links, wireless links, routers, gateway functionality, name servers, etc., governed by any protocol or combination of protocols.

The following summary provides a non-exhaustive list of illustrative aspects of the technology set forth herein.

According to a first aspect, a data processing system is described that includes two or more host components, each of which uses one or more central processing units to execute machine-readable instructions, the two or more host components collectively providing a software plane. The data processing system also includes two or more hardware acceleration components that collectively provide a hardware acceleration plane. The data processing system also includes a common network for allowing the host components to communicate with each other, and for allowing the hardware acceleration components to communicate with each other. Further, the hardware acceleration components in the hardware acceleration plane have functionality that enables the hardware acceleration components to communicate with each other in a transparent manner without assistance from the software acceleration plane.

According to a second aspect, the above-referenced two or more hardware acceleration components in the hardware acceleration plane correspond to field-programmable gate array (FPGA) devices.

According to a third aspect, the above-referenced two or more host components in the software plane exchange packets over the common network via a first logical network, and the above-referenced two or more hardware acceleration components in the hardware acceleration plane exchange packets over the common network via a second logical network. The first logical network and the second logical network share physical links of the common network and are distinguished from each other based on classes of traffic to which their respective packets pertain.

According to a fourth aspect, packets sent over the second logical network use a specified protocol on an identified port, which constitutes a characteristic that distinguishes packets sent over the second logical network from packets sent over the first logical network.

According to a fifth aspect, the data processing system further includes plural server unit components. Each server unit component includes: a local host component; a local hardware acceleration component; and a local link for coupling the local host component with the local hardware acceleration component. The local hardware acceleration component is coupled to the common network, and serves as a conduit by which the local host component communicates with the common network.

According to a sixth aspect, at least one server unit component includes plural local host components and/or plural local hardware acceleration components.

According to a seventh aspect, the local hardware acceleration component is coupled to a top-of-rack switch in a data center.

According to an eighth aspect, the local hardware acceleration component is also coupled to a network interface controller, and the network interface controller is coupled to the local host component.

According to a ninth aspect, the local host component or the local hardware acceleration component is configured to: issue a request for a service; and receive a reply to the request which identifies an address of the service. The local hardware acceleration component is configured to: locally perform the service, when the address that has been identified pertains to functionality that is locally implemented by the local hardware acceleration component; and route the request to a particular remote hardware acceleration component via the common network, when the address that has been identified pertains to functionality that is remotely implemented by the remote hardware acceleration component. Again, the local hardware acceleration component is configured to perform routing without involvement of the local host component.

According to a tenth aspect, the data processing system further includes management functionality for identifying the address in response to the request.

According to an eleventh aspect, a method is described for performing a function in a data processing environment. The method includes performing the following operations in a local host component which uses one or more central processing units to execute machine-readable instructions, or in a local hardware acceleration component that is coupled to the local host component: (a) issue a request for a service; and (b) receive a reply to the request which identifies an address of the service. The method also includes performing the following operations in the local hardware acceleration component: (a) locally perform the service, when the address that has been identified pertains to functionality that is locally implemented by the local hardware acceleration component; and (b) route the request to a remote hardware acceleration component, when the address that has been identified pertains to functionality that is remotely implemented by the remote hardware acceleration component. Again, the local hardware acceleration component is configured to perform routing to the remote hardware acceleration component without involvement of the local host component. Further, plural host components communicate with each other in the data processing environment, and plural hardware acceleration components communicate with each other in the data processing environment, over a common network.

According to a twelfth aspect, each hardware acceleration component in the above-described method corresponds to a field-programmable gate array (FPGA) device.

According to a thirteenth aspect, the common network in the above-described method supports a first logical network and a second logical network that share physical links of the common network. The host components in the data processing environment use the first logical network to exchange packets with each other, and the hardware acceleration components in the data processing environment use the second logical network to exchange packets with each other. The first logical network and the second logical networks are distinguished from each other based on classes of traffic to which their respective packets pertain.

According to a fourteenth aspect, the packets sent over the second network in the above-described method use a specified protocol on an identified port, which constitutes a characteristic that distinguishes packets sent over the second logical network from packets sent over the first logical network.

According to a fifteenth aspect, the local hardware acceleration component in the above-described method is coupled to the common network, and the local host component interacts with the common network via the local hardware acceleration component.

According to a sixteenth aspect, the local hardware acceleration component in the above-described method is coupled to a top-of-rack switch in a data center.

According to a seventeenth aspect, a server unit component in a data center is described. The server unit component includes: a local host component that uses one or more central processing units to execute machine-readable instructions; a local hardware acceleration component; and a local link for coupling the local host component with the local hardware acceleration component. The local hardware acceleration component is coupled to a common network, and serves as a conduit by which the local host component communicates with the common network. More generally, the data center includes plural host components and plural hardware acceleration components, provided in other respective server unit components, wherein the common network serves as a shared conduit by which the plural host components communicate with each other and the plural hardware acceleration components communicate with each other. Further, the local hardware acceleration component is configured to interact with remote hardware acceleration components of other respective server unit components without involvement of the local host component.

According to an eighteenth aspect, the server unit component includes plural local host components and/or plural local hardware acceleration components.

According to a nineteenth aspect, the local hardware acceleration component is coupled to a top-of-rack switch in a data center.

According to a twentieth aspect, the local hardware acceleration component is configured to receive a request for a service from the local host component, and the local hardware acceleration component is configured to: (a) locally perform the service when an address associated with the service pertains to functionality that is locally implemented by the local hardware acceleration component; and (b) route the request to a remote hardware acceleration component via the common network when the address pertains to functionality that is remotely implemented by the remote hardware acceleration component. The local hardware acceleration component is configured to perform routing to the remote hardware acceleration component without involvement of the local host component.

A twenty-first aspect corresponds to any combination (e.g., any permutation or subset) of the above-referenced first through twentieth aspects.

A twenty-second aspect corresponds to any method counterpart, device counterpart, system counterpart, means counterpart, computer readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data processing system comprising:
    a software plane comprising two or more host components having respective central processing units configured to execute machine-readable instructions;
    a hardware acceleration plane comprising two or more hardware acceleration components; and
    a common network configured to allow the two or more host components to communicate with each other, and to allow the two or more hardware acceleration components to communicate with each other,
    a first host component of the data processing system or a first hardware acceleration component associated with the first host component being configured to obtain an address of a specific hardware acceleration component that is configured to perform a requested service,
    the first hardware acceleration component being configured to:
        when the address identifies the first hardware acceleration component as the specific hardware acceleration component that is configured to perform the requested service, locally perform the requested service on the first hardware acceleration component, and
        when the address identifies a second hardware acceleration component as the specific hardware acceleration component that is configured to perform the requested service, route the request to the second hardware acceleration component via the common network without involvement of the first host component,
    the two or more hardware acceleration components in the hardware acceleration plane having parallel logic elements configured to perform computations to obtain intermediate results or final results of various services including the requested service, the two or more hardware acceleration components being configured to communicate the intermediate results or the final results of the various services to other hardware acceleration components in the hardware acceleration plane without assistance from the software plane.

2. The data processing system of claim 1, wherein said two or more hardware acceleration components in the hardware acceleration plane correspond to field-programmable gate array (FPGA) devices.

3. The data processing system of claim 1,
wherein said two or more host components in the software plane exchange packets over the common network via a first logical network,
wherein said two or more hardware acceleration components in the hardware acceleration plane exchange packets over the common network via a second logical network, and
wherein the first logical network and the second logical network share physical links of the common network and are distinguished from each other based on classes of traffic to which their respective packets pertain.

4. The data processing system of claim 3, wherein packets sent over the second logical network use a specified protocol on an identified port, which constitutes a characteristic that distinguishes packets sent over the second logical network from packets sent over the first logical network.

5. The data processing system of claim 1, further comprising plural server unit components, each server unit component comprising:
a local host component;
a local hardware acceleration component; and
a local physical link coupling the local host component with the local hardware acceleration component,
the local hardware acceleration component being coupled to the common network, and serving as a conduit by which the local host component communicates with the common network.

6. The data processing system of claim 5, wherein at least one server unit component includes plural local host components and/or plural local hardware acceleration components.

7. The data processing system of claim 5, wherein the local hardware acceleration component is coupled to a top-of-rack switch in a data center.

8. The data processing system of claim 5,
wherein the local hardware acceleration component is also coupled to a network interface controller, and
wherein the network interface controller is coupled to the local host component.

9. The data processing system of claim 5, the plural server unit components including a first server unit component that includes the first host component and the first hardware acceleration component and a second server unit component that includes a second host component and the second hardware acceleration component.

10. The data processing system of claim 1, an individual host component being configured to determine the address in response to a request for the requested service and send the address to the first hardware acceleration component.

11. A method for performing a service in a data processing environment comprising plural host components coupled to plural hardware acceleration components, the method comprising:
in a local host component or in a local hardware acceleration component that is coupled to the local host component:
issuing a request for the service; and
receiving a reply to the request which identifies an address of a specific hardware acceleration component that is configured to perform the service; and
in the local hardware acceleration component:
when the address identifies the local hardware acceleration component as the specific hardware acceleration component that is configured to perform the service:
locally performing the service on the local hardware acceleration component using parallel logic elements of the local hardware acceleration component, and
outputting, over a common network, intermediate or final results that are responsive to the request to a remote hardware acceleration component without involvement of the local host component; and
when the address identifies the remote hardware acceleration component as the specific hardware acceleration component that is configured to perform the service, routing the request to the remote hardware acceleration component, the remote hardware acceleration component using other parallel logic elements to output the intermediate or final results that are responsive to request to the local hardware acceleration component,
wherein the plural host components have respective processing units configured to execute instructions,
wherein the plural host components communicate with each other in the data processing environment over the common network, and
wherein the plural hardware acceleration components communicate with each other in the data processing environment over the common network.

12. The method of claim 11, wherein the local hardware acceleration component is a field-programmable gate array (FPGA) device.

13. The method of claim 11, wherein the common network supports a first logical network and a second logical network that share physical links of the common network, the method further comprising:
causing the plural host components in the data processing environment to use the first logical network to exchange packets with each other using a particular class of network traffic; and
causing the plural hardware acceleration components in the data processing environment to use the second logical network to exchange other packets with each other using another class of network traffic.

14. The method of claim 13, wherein the other packets sent over the second logical network use a specified protocol on an identified port, which constitutes a characteristic that distinguishes the other packets sent over the second logical network from the packets sent over the first logical network.

15. The method of claim 11, wherein the local hardware acceleration component is an application-specific integrated circuit.

16. The method of claim 15, wherein the local hardware acceleration component is coupled to a top-of-rack switch in a data center, the method comprising:
sending the intermediate or final results from the local hardware acceleration component, through the top-of-rack switch, and over the common network.

17. A server unit component comprising:
a local host component that uses one or more central processing units to execute machine-readable instructions;
a local hardware acceleration component having parallel logic elements; and
a local physical link configured to couple the local host component with the local hardware acceleration component,
the local hardware acceleration component being configured to couple to a common network and configured to serve as a conduit by which the local host component communicates with the common network in a data processing environment having respective other server unit components, the respective other server unit components comprising respective other host components and respective other hardware acceleration components with respective other parallel logic elements, the local host component, the local hardware acceleration component, the respective other host components, and the respective other hardware acceleration components being configured to perform various services, the local host component or the local hardware acceleration component being configured to determine an address of a specific hardware acceleration component that is configured to perform a requested service, the local hardware acceleration component being configured to:

when the address identifies the local hardware acceleration component as the specific hardware acceleration component that is configured to perform the requested service, locally perform the requested service on the local hardware acceleration component, and when the address identifies another hardware acceleration component as the specific hardware acceleration component that is configured to perform the requested service, route the request to the another hardware acceleration component via the common network without involvement of the local host component, the local hardware acceleration component having parallel logic elements configured to perform computations to obtain intermediate results or final results of the requested service, and the local hardware acceleration component being configured to communicate the intermediate results or the final results of the requested service to a further hardware acceleration component over the common network without assistance from the local host component.

18. The server unit component of claim 17, wherein the server unit component includes plural local host components and/or plural local hardware acceleration components.

19. The server unit component of claim 17, wherein the local hardware acceleration component is coupled to a top-of-rack switch in a data center.

20. The server unit component of claim 17, wherein the local hardware acceleration component and the local host component are configured to communicate over the common network using network traffic with different characteristics such that communications by the local hardware acceleration component are received by other hardware acceleration components and other communications by the local host component are received by other host components.

* * * * *